(12) United States Patent
Hirano et al.

(10) Patent No.: US 11,792,219 B2
(45) Date of Patent: Oct. 17, 2023

(54) ANOMALY DETECTING DEVICE, ANOMALY DETECTING SYSTEM, AND ANOMALY DETECTING METHOD

(71) Applicant: PANASONIC INTELLECTUAL PROPERTY CORPORATION OF AMERICA, Torrance, CA (US)

(72) Inventors: Ryo Hirano, Osaka (JP); Yoshihiro Ujiie, Osaka (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/738,837

(22) Filed: May 6, 2022

(65) Prior Publication Data

US 2022/0263709 A1 Aug. 18, 2022

Related U.S. Application Data

(63) Continuation of application No. PCT/JP2021/018961, filed on May 19, 2021.

(30) Foreign Application Priority Data

May 26, 2020 (WO) .................. PCT/JP2020/020812

(51) Int. Cl.
*H04L 9/40* (2022.01)
*H04L 41/0681* (2022.01)
*H04L 47/10* (2022.01)

(52) U.S. Cl.
CPC ...... *H04L 63/1425* (2013.01); *H04L 41/0681* (2013.01); *H04L 47/10* (2013.01); *H04L 63/1458* (2013.01)

(58) Field of Classification Search
CPC .................. H04L 63/1425; H04L 63/1458
See application file for complete search history.

(56) References Cited

U.S. PATENT DOCUMENTS 11,301,410 B1 * 4/2022 Caruk ................. G06F 13/4068
11,438,355 B2 * 9/2022 Terazawa ............ H04L 12/4625
(Continued)

FOREIGN PATENT DOCUMENTS

| JP | 5664799 | 2/2015 | |
| WO | 2019/021922 | 1/2019 | |
| WO | WO-2021107822 A1 * | 6/2021 | ........... G06F 21/554 |

OTHER PUBLICATIONS

Claise et al., "Specification of the IP Flow Information Export (IPFIX) Protocol for the Exchange of Flow Information", Internet Engineering Task Force (IETF), Request for Comments 7011, Sep. 2013, pp. 1-76.

(Continued)

*Primary Examiner* — Bryan Y Lee
(74) *Attorney, Agent, or Firm* — GREENBLUM & BERNSTEIN, P.L.C.

(57) ABSTRACT

An anomaly detecting device includes a flow collector that collects an amount of flow communication traffic in each of two or more networks in an in-vehicle network system that including the two or more networks, the amount of flow communication traffic being information obtained by tallying an amount of communication traffic of one or more frames classified according to a predetermined rule that is based on header information of a network protocol; and an anomaly detector that calculates, based on the amount of flow communication traffic, an observed ratio indicating a ratio of respective amounts of communication traffic in the two or more networks and determines whether the two or more networks are anomalous based on the observed ratio (Continued)

calculated and a normal ratio indicating a ratio of respective amounts of communication traffic in the two or more networks in a normal state.

22 Claims, 14 Drawing Sheets

(56) References Cited

U.S. PATENT DOCUMENTS

| | | | |
|---|---|---|---|
| 2014/0165191 A1* | 6/2014 | Ahn | H04L 67/12 |
| | | | 726/22 |
| 2014/0328352 A1 | 11/2014 | Mabuchi et al. | |
| 2015/0046966 A1* | 2/2015 | Sheng | H04N 21/25 |
| | | | 725/116 |
| 2015/0229669 A1* | 8/2015 | Xin | H04L 63/1458 |
| | | | 726/23 |
| 2016/0188396 A1 | 6/2016 | Sonalker et al. | |
| 2018/0131712 A1* | 5/2018 | Cornelio | H04L 63/14 |
| 2020/0137099 A1 | 4/2020 | Haga et al. | |
| 2021/0075800 A1* | 3/2021 | Paraskevas | H04L 63/1441 |

OTHER PUBLICATIONS

International Search Report issued in International Pat. Appl. No. PCT/JP2020/020812, dated Jul. 14, 2020, and an English translation thereof.

International Search Report issued in International Pat. Appl. No. PCT/JP2021/018961, dated Jul. 13, 2021, and an English translation thereof.

Extended European Search Report issued in European Patent Application No. 21812943.5, dated May 17, 2023.

\* cited by examiner

FIG. 4

| Classification number | Protocol | Classification field | | Classification label | Enabled and disabled state |
|---|---|---|---|---|---|
| | | Field name | Verification value | | |
| 1 | CAN | ID | ALL | All frames | Disabled |
| 2 | CAN | ID | 20 | Automatic drive ECU | Enabled |
| 3 | CAN | ID | 21 | Vehicle control, Automatic drive ECU | Enabled |
| 4 | CAN | ID | 22 | Software update | Enabled |
| 5 | CAN | ID | 23 | Vehicle diagnosis | Enabled |
| 6 | FlexRay | Slot | ALL | All frames | Enabled |
| 7 | FlexRay | Slot | 30 | Automatic drive ECU | Disabled |
| 8 | FlexRay | Slot | 31 | Vehicle control, Automatic drive ECU | Enabled |
| 9 | FlexRay | Slot | 32 | Software update | Enabled |
| 10 | FlexRay | Slot | 33 | Vehicle diagnosis | Enabled |
| 11 | Ethernet (SOME/IP) | Message ID | ALL | All frames | Disabled |
| 12 | Ethernet (SOME/IP) | Message ID | 41 | Automatic drive ECU | Enabled |
| 13 | Ethernet (SOME/IP) | Message ID | 42 | Automatic drive ECU | Enabled |
| 14 | Ethernet (SOME/IP) | Message ID | 43 | Software update | Enabled |
| 15 | Ethernet (SOME/IP) | Message ID | 44 | Vehicle diagnosis | Enabled |

FIG. 5

| ID | Data length | Payload | | | | | |
|---|---|---|---|---|---|---|---|
| | | First byte | Second byte | Third byte | Fourth byte | Fifth byte | ... | Eighth byte |
| 20 | 8 bytes | Counter | Automatic drive state | Unused | Unused | Unused | ... | Unused |
| 21 | 8 bytes | Counter | Speed command | Speed | Unused | Unused | ... | Unused |
| 22 | 8 bytes | Counter | Update software data | | | | ... | Update complete flag |
| 23 | 8 bytes | Counter | Diagnosis command | Diagnosis code | Unused | Unused | ... | Diagnosis complete flag |

FIG. 6

| Slot | Data length | Payload | | | | | | |
|---|---|---|---|---|---|---|---|---|
| | | First byte | Second byte | Third byte | Fourth byte | Fifth byte | ... | Eighth byte |
| 30 | 8 bytes | Counter | Automatic drive state | Unused | Unused | Unused | ... | Unused |
| 31 | 16 bytes | Counter | Steering command | Angle | Unused | Unused | ... | Unused |
| 32 | 64 bytes | Counter | Update software data | | | | ... | Update complete flag |
| 33 | 8 bytes | Counter | Diagnosis command | Diagnosis code | Unused | Unused | ... | Diagnosis complete flag |

FIG. 7

| MAC address (Src/Dst) | IP address (Src/Dst) | Port (Src/Dst) | SOME/IP | | |
|---|---|---|---|---|---|
| | | | Message ID | Data length | Payload |
| M1/M2 | IP1/IP2 | P11/P21 | 40 | 8 | Automatic drive state |
| M1/M3 | IP1/IP3 | P12/P31 | 41 | 512 | Camera control command<br>Image data |
| M1/M2 | IP1/IP2 | P13/P22 | 42 | 1024 | Update software data<br>Update complete flag |
| M4/M3 | IP4/IP3 | P4/P3 | 43 | 8 | Diagnosis command<br>Diagnosis code<br>Diagnosis complete flag |

FIG. 8

| Protocol | Flow type | Tally of the number of frames | Tally of data size | Transmission condition |
|---|---|---|---|---|
| CAN | All frames in automatic driving | 10 | 80 | Passage of 10 minutes |
| CAN | Automatic drive ECU | 20 | 160 | Passage of 10 minutes |
| CAN | Vehicle control | 10 | 80 | Passage of 10 minutes |
| CAN | Software update | 80 | 640 | Update complete |
| CAN | Vehicle diagnosis | 10 | 80 | Diagnosis complete |
| FlexRay | All frames in automatic driving | 100 | 1600 | Passage of 10 minutes |
| FlexRay | Automatic drive ECU | 20 | 160 | Passage of 10 minutes |
| FlexRay | Vehicle control | 10 | 160 | Passage of 10 minutes |
| FlexRay | Software update | 10 | 640 | Update complete |
| FlexRay | Vehicle diagnosis | 20 | 160 | Diagnosis complete |
| Ethernet (SOME/IP) | All frames in automatic driving | 10000 | 320000 | Passage of 10 minutes |
| Ethernet (SOME/IP) | Automatic drive ECU | 10 | 80 | Passage of 10 minutes |
| Ethernet (SOME/IP) | Vehicle control | 0 | 0 | Passage of 10 minutes |
| Ethernet (SOME/IP) | Software update | 10 | 1280 | Update complete |
| Ethernet (SOME/IP) | Vehicle diagnosis | 10 | 80 | Diagnosis complete |

FIG. 9

| Flow type | Frame count ratio by protocol | | | Data size ratio by protocol | | |
|---|---|---|---|---|---|---|
| | CAN | FlexRay | Ethernet | CAN | FlexRay | Ethernet |
| All frames in automatic driving | 1 | 10 | 1000 | 1 | 20 | 4000 |
| Automatic drive ECU | 2 | 2 | 1 | 2 | 2 | 1 |
| Vehicle control | 1 | 1 | 0 | 1 | 2 | 0 |
| Software update | 8 | 1 | 1 | 1 | 8 | 128 |
| Vehicle diagnosis | 1 | 1 | 1 | 1 | 1 | 1 |

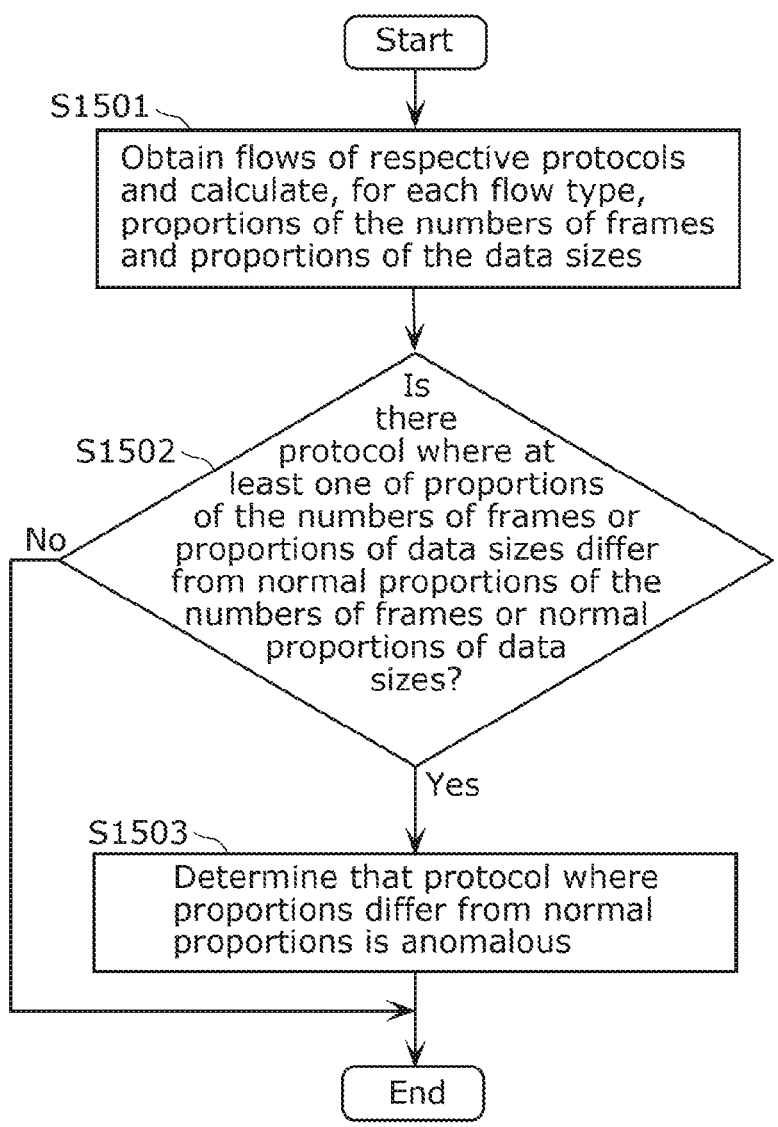

ANOMALY DETECTING DEVICE, ANOMALY DETECTING SYSTEM, AND ANOMALY DETECTING METHOD

CROSS REFERENCE TO RELATED APPLICATIONS

This is a continuation application of PCT International Application No. PCT/JP2021/018961 filed on May 19, 2021, designating the United States of America, which is based on and claims priority of PCT International Application No. PCT/JP2020/020812 filed on May 26, 2020. The entire disclosures of the above-identified applications, including the specifications, drawings and claims are incorporated herein by reference in their entirety.

FIELD

The present disclosure relates to an anomaly detecting device, an anomaly detecting system, and an anomaly detecting method.

BACKGROUND

Nowadays, a large number of devices called electronic control units (ECUs) are disposed in a system within a vehicle. These ECUs are connected to each other by a network, and this network is called an in-vehicle network.

Control frames are transmitted and received over the in-vehicle network, and such control frames instruct the vehicle to, for example, move, stop, or turn. For example, a malicious attacker, spoofing as a legitimate ECU, may carry out an attack on the vehicle by transmitting a control frame, or an attacker may carry out a denial-of-service (DoS) attack attempting to prevent the vehicle from receiving a specific control frame. Such an attack can create a risk to not only the occupants of the vehicle but also pedestrians around the vehicle.

As a measure against such a problem, there is known a method of detecting an anomaly in a network by use of a detection algorithm specialized for a specific protocol. For example, Patent Literature (PTL) 1 discloses a method of detecting an anomaly based on the intervals of receiving specific frames flowing over the network.

CITATION LIST

Patent Literature

PTL 1: Japanese Patent No. 5664799

Non Patent Literature

NPL 1: Specification of the IP Flow Information Export (IPFIX) Protocol for the Exchange of Flow Information (RFC7011)

SUMMARY

Technical Problem

There are a number of protocols for in-vehicle networks. Some examples of such protocols for in-vehicle networks include Controller Area Network (CAN) defined by ISO 11898-1, FlexRay (registered trademark, the same hereinafter) formulated by the FlexRay Consortium, and Ethernet (registered trademark, the same hereinafter) defined by IEEE 802.3.

The method disclosed in PTL 1 is effective in detecting an anomaly in CAN, where the reception intervals are disrupted when an anomaly occurs. The same method, however, is not effective in detecting an anomaly in FlexRay, where frames remain being transmitted at constant communication intervals even when an anomaly has occurred.

Meanwhile, Non Patent Literature (NPL) 1 discloses a specification called IPFIX, for example, as a method of monitoring communication in an entire network. IPFIX detects an anomaly based on information included in an Ethernet header or a TCP/IP header. Yet, IPFIX is not effective in detecting an anomaly in CAN or FlexRay, for example.

It is possible to equip a vehicle with a plurality of anomaly detecting devices each specialized for a specific protocol, but this configuration creates a cost problem. In this manner, with the existing techniques, it has been difficult to detect an anomaly in communication over an in-vehicle network with a simple configuration.

Accordingly, the present disclosure provides an anomaly detecting device, an anomaly detecting system, and an anomaly detecting method that each make it possible to detect an anomaly in communication over an in-vehicle network with a simple configuration.

Solution to Problem

An anomaly detecting device according to one aspect of the present disclosure includes: a flow collector that collects an amount of flow communication traffic in each of two or more networks in an in-vehicle network system that includes the two or more networks, the amount of flow communication traffic being information obtained by tallying an amount of communication traffic of one or more frames classified according to a predetermined rule that is based on header information of a network protocol; and an anomaly determiner that calculates, based on the amount of flow communication traffic, an observed ratio indicating a ratio of respective amounts of communication traffic in the two or more networks and determines whether the two or more networks are anomalous based on the observed ratio calculated and a normal ratio indicating a ratio of respective amounts of communication traffic in the two or more networks in a normal state.

An anomaly detecting system according to one aspect of the present disclosure is an anomaly detecting system in an in-vehicle network system that includes two or more networks, and the anomaly detecting system includes: the anomaly detecting device according to any one of claims 1 to 10; and a flow generating device that is connected to one or more networks of the two or more networks and tallies the amount of flow communication traffic, wherein the flow generating device includes: a frame obtainer that obtains a frame in the one or more networks; a frame classifier that classifies the obtained frame according to a predetermined rule that is based on header information of a protocol used in the one or more networks; a flow tallier that tallies an amount of flow communication traffic that is information obtained by tallying an amount of communication traffic of one or more frames classified by the frame classifier, the one or more frames each being the frame; and a flow transmitter that transmits the amount of flow communication traffic tallied to the anomaly detecting device.

An anomaly detecting method according to one aspect of the present disclosure includes: collecting an amount of flow communication traffic in each of two or more networks in an in-vehicle network system that includes the two or more networks, the amount of flow communication traffic being information obtained by tallying an amount of communication traffic of one or more frames classified according to a predetermined rule that is based on header information of a network protocol; and calculating, based on the amount of flow communication traffic, an observed ratio indicating a ratio of respective amounts of communication traffic in the two or more networks and determining whether the two or more networks are anomalous based on a normal ratio indicating a ratio of respective amounts of communication traffic in the two or more networks in a normal state and the observed ratio.

Advantageous Effects

The anomaly detecting device and so on according to some aspects of the present disclosure make it possible to detect an anomaly in communication over an in-vehicle network with a simple configuration.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a table illustrating an example of a classification rule according to one embodiment.

FIG. 5 is a table illustrating an example of a CAN frame according to one embodiment.

FIG. 6 is a table illustrating an example of a FlexRay frame according to one embodiment.

FIG. 7 is a table illustrating an example of an Ethernet (SOME/IP) frame according to one embodiment.

FIG. 8 is a table illustrating an example of a flow tally according to one embodiment.

FIG. 9 is a table illustrating an example of a detection rule according to one embodiment.

FIG. 15 illustrates a flowchart of an anomaly detecting process according to one embodiment.

DESCRIPTION OF EMBODIMENTS

Figure 1:
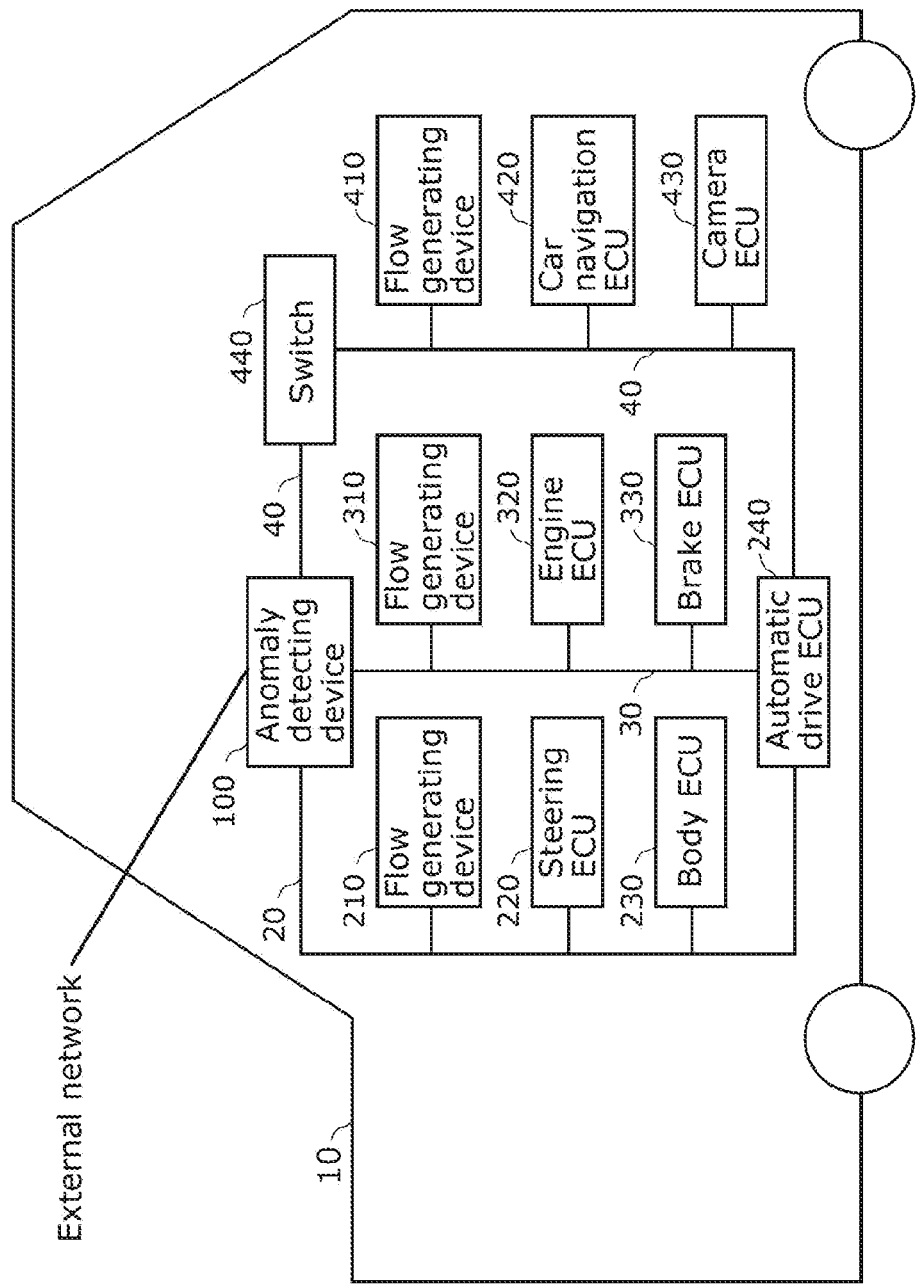
FIG. 1 is a diagram illustrating an overall configuration of an in-vehicle network system according to one embodiment.

Underlying Knowledge Forming Basis of the Present Disclosure

Prior to describing some embodiments and so on according to the present disclosure, the underlying knowledge forming the basis of the present disclosure will be described.

As described above in Technical Problem, while there are a number of protocols for in-vehicle networks, the method disclosed in PTL 1 faces difficulty in accurately detecting an anomaly if a protocol other than a specific protocol (e.g., a protocol, such as CAN, having characteristics where the reception intervals are disrupted when an anomaly occurs) is used. Therefore, there exists a demand for an anomaly detecting device that can detect an anomaly in an in-vehicle network regardless of the protocol used in the in-vehicle network.

Meanwhile, in an in-vehicle network, a plurality of protocols may be employed within a single system from the communication requirement and the cost standpoint. For example, Controller Area Network (CAN) defined by ISO 11898-1, FlexRay formulated by the FlexRay Consortium, and Ethernet defined by IEEE 802.3 may be employed as in-vehicle networks within a single in-vehicle system.

Even when this is the case, the method disclosed in PTL 1 is not effective in detecting an anomaly in protocols other than a specific protocol. Moreover, it is difficult to implement an anomaly detecting method that is effective for a plurality of protocols. Although it is possible to implement a plurality of anomaly detecting methods each specialized for a specific protocol, such implementation creates a cost problem.

Meanwhile, Non Patent Literature (NPL) 1 discloses a specification called IPFIX, for example, as a method of monitoring communication in an entire network. In IPFIX, a plurality of frames flowing over the Ethernet are classified by an Ethernet switch based on information included in an Ethernet header or a TCP/IP header, and statistical information called a flow is generated. Then, an anomaly detecting device higher than the Ethernet switch collects the flows and monitors the communication on a flow by flow basis. This configuration makes it possible to monitor the communication in the entire network with low computational complexity and with low communication traffic.

Yet, an in-vehicle network may include, for example, CAN or FlexRay in addition to Ethernet. Therefore, it is difficult to monitor the communication in the entire in-vehicle network only by Ethernet headers or TCP/IP headers.

In this manner, with the existing techniques, it has been difficult to detect an anomaly in communication over an in-vehicle network (e.g., in the entire in-vehicle network) with a simple configuration. Accordingly, the inventors of the present application have diligently ruminated over anomaly detecting devices and so on that can detect an anomaly in communication over an in-vehicle network with a simple configuration and conceived of an anomaly detecting device and so on described hereinafter.

An anomaly detecting device according to one aspect of the present disclosure includes a flow collector and an anomaly determiner. The flow collector collects an amount of flow communication traffic in each of two or more networks in an in-vehicle network system that includes the two or more networks, and the amount of flow communication traffic is information obtained by tallying an amount of communication traffic of one or more frames classified according to a predetermined rule that is based on header information of a network protocol. The anomaly determiner calculates, based on the amount of flow communication traffic, an observed ratio indicating a ratio of respective amounts of communication traffic in the two or more networks and determines whether the two or more networks are anomalous based on the observed ratio calculated and a normal ratio indicating a ratio of respective amounts of communication traffic in the two or more networks in a normal state.

With this configuration, frames are classified according to the classification common between the protocols, and thus the higher anomaly detecting device can handle the information consistently without paying attention to the difference in the header and the payload between different protocols. Moreover, such a configuration renders it unnecessary to implement a plurality of anomaly detecting methods specialized for the respective networks, and the communication in the entire in-vehicle network can be monitored at low cost. Accordingly, an anomaly in communication over the in-vehicle network can be detected with a simple configuration.

For example, the anomaly determiner may determine that the two or more networks are anomalous when the observed ratio and the normal ratio differ from each other at a predetermined rate or higher.

This configuration makes it possible to determine the presence of an anomaly with ease based on whether the observed ratio and the normal ratio differ from each other at a predetermined rate or higher.

For example, the anomaly determiner may determine that, of the two or more networks, a network in which the observed ratio and the normal ratio differ from each other at a highest rate is anomalous.

This configuration makes it possible to not only determine that an anomaly has occurred in any one of the networks but also identify the network where the anomaly has occurred. In other words, in identifying a network where an anomaly has occurred, the above configuration makes it possible to detect the anomaly in the network with higher accuracy. For example, by identifying a network where an anomaly has occurred, a routine for frames involved in the anomalous network can be changed, and a measure such as switching to another network can be taken promptly against the anomaly.

For example, the two or more networks may communicate by use of mutually different two or more network protocols, the observed ratio may be a ratio of respective amounts of communication traffic of the two or more protocols calculated based on the amount of flow communication traffic, and the anomaly determiner may calculate, as the observed ratio, the ratio of the respective amounts of communication traffic of the two or more protocols based on the amount of flow communication traffic.

With this configuration, the use of the method of detecting an anomaly by comparing the amounts of communication traffic of the respective protocols renders it unnecessary to implement a plurality of anomaly detecting methods specialized for the respective protocols and makes it possible to monitor the communication over the entire network at low cost.

For example, the anomaly determiner may determine that, of the two or more protocols, a protocol in which the observed ratio and the normal ratio differ from each other at a highest rate is anomalous.

This configuration makes it possible to not only determine that an anomaly has occurred in any one of the protocols but also identify the protocol where the anomaly has occurred.

In other words, in identifying a protocol where an anomaly has occurred, the above configuration makes it possible to detect the anomaly in the network with higher accuracy. For example, by identifying a protocol where an anomaly has occurred, a routine for frames involved in a network where the anomalous protocol is used can be changed, and a measure such as transmitting a frame by another protocol can be taken promptly against the anomaly.

For example, the amount of flow communication traffic may be information obtained by tallying the amount of communication traffic including at least either of a total number of frames or a data size of the one or more frames in each of the two or more networks, and the one or more frames may be classified according to a function based on an ID when the network protocol is CAN, CAN-FD, or 31939, classified according to the function based on a cycle and a slot when the network protocol is FlexRay, classified according to the function based on a MAC address, an IP address, or a port number when the network protocol is Ethernet, classified according to the function based on a message ID when the network protocol is SOME/IP, or classified according to the function based on a topic IP or a GUID when the network protocol is DDS.

With this configuration, the anomaly detecting device can compare the amounts of communication traffic pertaining to each specific function between a plurality of different protocols. In a vehicle, various electronic control units communicate with each other via an in-vehicle network or a protocol in order to achieve a specific function. For example, with regard to an automatic driving function, the steering, the engine, the camera, and so on are controlled via not only a single in-vehicle network but also a plurality of in-vehicle networks in order to achieve this function. In such a case, if frames related to a specific function increase in any of the networks or the protocols, frames related to the same function increase in another network or protocol. In other words, if the amount of communication traffic pertaining to a specific function differs from its amount of communication traffic to be held in a normal state, the anomaly detecting device can determine that an anomaly that affects the amount of communication traffic has occurred in a specific network.

For example, the amount of flow communication traffic may be information obtained by tallying the amount of communication traffic including at least either of a total number of frames or a data size of the one or more frames in each of the two or more networks, and the one or more frames may be classified according to a sender or a designated recipient based on an ID when the network protocol is CAN, CAN-FD, or 31939, classified according to the sender or the designated recipient based on a cycle and a slot when the network protocol is FlexRay, classified according to the sender or the designated recipient based on a MAC address, an IP address, or a port number when the network protocol is Ethernet, classified according to the sender or the designated recipient based on a message ID when the network protocol is SOME/IP, or classified according to the sender or the designated recipient based on a topic IP or a GUID when the network protocol is DDS.

With this configuration, the anomaly detecting device can compare the amounts of communication traffic pertaining to each specific sender or designated recipient between a plurality of different protocols. In Ethernet, information on the sender and the designated recipient is stored in the header by use of the MAC address or the IP address. In contrast, in protocols such as CAN or FlexRay, information on the sender or the designated recipient is not stored in the header. Therefore, by managing the ID or the slot and information on the sender and the designated recipient associated with each other in advance, frames can be classified according to the sender and the designated recipient. For example, in the automatic driving function, the steering, the engine, the camera, and so on are controlled via not only a single in-vehicle network but also a plurality of in-vehicle networks in order to achieve this function, and an automatic drive ECU transmits frames with respect to a plurality of protocols. In such a case, if the automatic drive ECU transmits a large number of frames in any one of the networks or the protocols, a large number of frames are transmitted from the automatic drive ECU in another network or protocol. In other words, if the amount of communication traffic pertaining to a specific sender or designated recipient differs from its amount of communication traffic to be held in a normal state, the anomaly detecting device can determine that an anomaly that affects the amount of communication traffic has occurred in a specific network.

For example, the amount of flow communication traffic may be information obtained by tallying the amount of communication traffic including at least either of a total number of frames or a data size of the one or more frames received within a period corresponding to a vehicle state in each of the two or more networks, and the vehicle state may include at least one of in automatic driving, in automatic parking, in cruise control, in software update, in vehicle diagnosis, and in internet communication connection.

With this configuration, the anomaly detecting device can compare the amounts of communication traffic pertaining to each specific vehicle state between a plurality of different protocols. The amount of communication traffic in all the networks changes temporarily in accordance with the vehicle state. For example, vehicle control frames increase during automatic driving, frames related to the software update increase during the software update, frames related to the vehicle diagnosis increase during the vehicle diagnosis, and frames related to web services increase during internet communication connection. In such a case, an anomaly can be detected based on the possibility that the vehicle control, the software update, the vehicle diagnosis, the internet connection, or the like to be executed in a specific vehicle state is experiencing interference in a network where the amount of communication traffic does not increase. In other words, an anomaly in a network can be detected more specifically.

For example, the anomaly detecting device may further include an anomaly notifier that, when the anomaly determiner determines that there is an anomaly, notifies a vehicle's occupant or a server external to the vehicle of the anomaly.

This configuration makes it possible to inform the vehicle's occupant or an external server of a danger promptly when an anomaly has occurred.

For example, the anomaly detecting device may further include a detection rule updater that updates the normal ratio based on information obtained via an external network.

This configuration makes it possible to take an appropriate measure by updating the normal ratio even when the software update has caused the normal ratio of the amounts of communication traffic to change.

For example, the predetermined rule may be information used to append, to a frame, a classification label for classifying the frame, and the amount of flow communication traffic may be information that is based on the one or more frames classified according to the classification label.

This configuration makes it possible to classify a frame with ease by use of the classification label.

For example, the predetermined rule may provide, for each network protocol, an association between a field name included in the header information, the classification label, and an enabled or disabled state indicating whether appending of the classification label is enabled, and the anomaly determiner may refrain from appending the classification label to a frame when the enabled or disabled state of the frame indicates that the appending is disabled.

This configuration makes it possible to separate a frame to be classified and a frame not to be classified. For example, an anomaly in a network can be detected with higher accuracy when only a desired frame is used.

For example, the classification label may include all frames, automatic drive ECU, vehicle control, software update, and vehicle diagnosis.

This configuration makes it possible to detect which one of all frames, automatic drive ECU, vehicle control, software update, and vehicle diagnosis the anomaly pertains to. Herein, all frames means all the frames related to automatic driving, for example.

For example, the observed ratio may include at least one of a frame count ratio by the network protocol or a data size ratio by the network protocol, the normal ratio may include the at least one of the frame count ratio in a normal state or the data size ratio in a normal state, and the anomaly detector may determine that there is an anomaly when the at least one of the frame count ratio or the data size ratio included in the observed ratio and the at least one of the frame count ratio or the data size ratio included in the normal ratio differ from each other at a predetermined rate or higher.

This configuration makes it possible to determine that an anomaly has occurred in a network in which at least one of the frame count ratio or the data size ratio differs from its normal counterpart at a predetermined rate or higher.

An anomaly detecting system according to one aspect of the present disclosure is an anomaly detecting system in an in-vehicle network system that includes two or more networks, and the anomaly detecting system includes the anomaly detecting device and a flow generating device that is connected to one or more networks of the two or more networks and tallies the amount of flow communication traffic. The flow generating device includes a frame obtainer, a frame classifier, a flow tallier, and a flow transmitter. The frame obtainer obtains a frame in the one or more networks. The frame classifier classifies the obtained frame according to a predetermined rule that is based on header information of a protocol used in the one or more networks. The flow tallier tallies an amount of flow communication traffic that is information obtained by tallying an amount of communication traffic of one or more frames classified by the frame classifier, and the one or more frames here are each the frame. The flow transmitter transmits the amount of flow communication traffic tallied to the anomaly detecting device.

With this configuration, the constituent elements included in the anomaly detecting system make it possible to classify a frame and to detect an anomaly in a network within a single system. For example, when the anomaly detecting device and the flow generating device are provided within a vehicle, an anomaly can be determined without communicating with an external device. In other words, an anomaly can be determined more reliably regardless of the communication state between the vehicle and the external device.

For example, the frame classifier may classify the frame according to a function based on an ID when the network protocol is CAN, CAN-FD, or 31939, classify the frame according to the function based on a cycle and a slot when the network protocol is FlexRay, classify the frame according to the function based on a MAC address, an IP address, or a port number when the network protocol is Ethernet, classify the frame according to the function based on a message ID when the network protocol is SOME/IP, or classify the frame according to the function based on a topic IP or a GUID when the network protocol is DDS, in each of the two or more networks.

With this configuration, the anomaly detecting device can compare the amounts of communication traffic pertaining to each specific function between a plurality of different protocols. In a vehicle, various electronic control units communicate with each other via an in-vehicle network or a protocol in order to achieve a specific function. For example, with regard to an automatic driving function, the steering, the engine, the camera, and so on are controlled via not only a single in-vehicle network but also a plurality of in-vehicle networks in order to achieve this function. In such a case, if frames related to a specific function increase in any of the networks or the protocols, frames related to the same function increase in another network or protocol. In other words, if the amount of communication traffic pertaining to a specific function differs from its amount of communication traffic to be held in a normal state, the anomaly detecting device can determine that an anomaly that affects the amount of communication traffic has occurred in a specific network.

For example, the frame classifier may classify the frame according to a sender or a designated recipient based on an ID when the network protocol is CAN, CAN-FD, or 31939, classify the frame according to the sender or the designated recipient based on a cycle and a slot when the network protocol is FlexRay, classify the frame according to the sender or the designated recipient based on a MAC address, an IP address, or a port number when the network protocol is Ethernet, classify the frame according to the sender or the designated recipient based on a message ID when the network protocol is SOME/IP, or classify the frame according to the sender or the designated recipient based on a topic IP or a GUID when the network protocol is DDS, in each of the two or more networks.

With this configuration, the anomaly detecting device can compare the amounts of communication traffic pertaining to each specific sender or designated recipient between a plurality of different protocols. In Ethernet, information on the sender and the designated recipient is stored in the header by use of the MAC address or the IP address. In contrast, in protocols such as CAN or FlexRay, information on the sender or the designated recipient is not stored in the header. Therefore, by managing the ID or the slot and information on the sender and the designated recipient associated with each other in advance, frames can be classified according to the sender and the designated recipient. For example, in the automatic driving function, the steering, the engine, the camera, and so on are controlled via not only a single in-vehicle network but also a plurality of in-vehicle networks in order to achieve this function, and an automatic drive ECU transmits frames with respect to a plurality of protocols. In such a case, if the automatic drive ECU transmits a large number of frames in any one of the networks or the protocols, a large number of frames are transmitted from the automatic drive ECU in another network or protocol. In other words, if the amount of communication traffic pertaining to a specific sender or designated recipient differs from its amount of communication traffic to be held in a normal state, the anomaly detecting device can determine that an anomaly that affects the amount of communication traffic has occurred in a specific network.

For example, the frame classifier may classify the frame based on a vehicle state in each of the two or more networks, and the vehicle state may include at least one of in automatic driving, in automatic parking, in cruise control, in software update, in vehicle diagnosis, or in internet communication connection.

With this configuration, the anomaly detecting device can compare the amounts of communication traffic pertaining to each specific vehicle state between a plurality of different protocols. The amount of communication traffic in all the networks changes temporarily in accordance with the vehicle state. For example, vehicle control frames increase during automatic driving, frames related to the software update increase during the software update, frames related to the vehicle diagnosis increase during the vehicle diagnosis, and frames related to web services increase during internet communication connection. In such a case, an anomaly can be detected based on the possibility that the vehicle control, the software update, the vehicle diagnosis, the internet connection, or the like to be executed in a specific vehicle state is experiencing interference in a network where the amount of communication traffic does not increase.

For example, the flow generating device may further include a classification rule updater that updates the predetermined rule.

With this configuration, even when the software update has changed the association between the ID and the function or even when the normal ratio of the amounts of communication traffic has changed, a measure can be taken by updating the normal ratio in the detection rule.

An anomaly detecting method according to one aspect of the present disclosure includes collecting an amount of flow communication traffic in each of two or more networks in an in-vehicle network system that includes the two or more networks, the amount of flow communication traffic being information obtained by tallying an amount of communication traffic of one or more frames classified according to a predetermined rule that is based on header information of a network protocol; and calculating, based on the amount of flow communication traffic, an observed ratio indicating a ratio of respective amounts of communication traffic in the two or more networks and determining whether the two or more networks are anomalous based on a normal ratio indicating a ratio of respective amounts of communication traffic in the two or more networks in a normal state and the observed ratio.

This method provides advantageous effects similar to those of the anomaly detecting device described above.

General or specific aspects of the above may be implemented in the form of a system, a method, an integrated circuit, a computer program, or a computer readable recording medium, such as a CD-ROM, or through any desired combination of a system, a method, an integrated circuit, a computer program, and a recording medium.

Hereinafter, an anomaly detecting device and so on according to some embodiments will be described with reference to the drawings. The embodiments described herein merely illustrate some specific examples of the present disclosure. Therefore, the numerical values, the constituent elements, the arrangement and the connection modes of the constituent elements, the steps as the elements of a process, the order of the steps, and so on illustrated in the following embodiments are examples and are not intended to limit the present disclosure. Among the constituent elements according to the following embodiments, any constituent element that is not described in the independent claims is a constituent element that can be added optionally.

Meanwhile, the drawings are schematic diagrams and do not necessarily provide the exact depictions.

Embodiment

Overall Configuration Diagram of In-Vehicle Network System 10

FIG. 1 is a diagram illustrating an overall configuration of in-vehicle network system 10 according to the present embodiment.

As illustrated in FIG. 1, in-vehicle network system 10 includes anomaly detecting device 100, flow generating device 210, steering ECU 220, body ECU 230, automatic drive ECU 240, flow generating device 310, engine ECU 320, brake ECU 330, flow generating device 410, car navigation ECU 420, camera ECU 430, and switch 440. Anomaly detecting device 100, flow generating device 210, flow generating device 310, and flow generating device 410 are included in an anomaly detecting system.

Anomaly detecting device 100, flow generating device 210, steering ECU 220, body ECU 230, and automatic drive ECU 240 are connected to each other via CAN network 20, and CAN network 20 is a type of an in-vehicle network.

Meanwhile, anomaly detecting device 100, flow generating device 310, engine ECU 320, brake ECU 330, and automatic drive ECU 240 are connected to each other via FlexRay network 30, and FlexRay network 30 is another type of an in-vehicle network.

Meanwhile, anomaly detecting device 100, flow generating device 410, car navigation ECU 420, camera ECU 430, switch 440, and automatic drive ECU 240 are connected to each other via Ethernet network 40, and Ethernet network 40 is yet another type of an in-vehicle network.

In this example, three in-vehicle networks that are different from one another are illustrated in FIG. 1. The number of in-vehicle networks to be provided in in-vehicle network system 10, however, is not limited to three, and it suffices that in-vehicle network system 10 include two or more in-vehicle networks. The three in-vehicle networks are networks that use respective protocols that are different from one another. Alternatively, at least two of the in-vehicle networks may use the same protocol.

Anomaly detecting device 100 is connected to an external network, such as the internet, in addition to CAN network 20, FlexRay network 30, and Ethernet network 40.

Anomaly detecting device 100 detects an anomaly in a network and notifies a server on the internet of the detected anomaly via the external network or notifies an occupant, such as the driver, of the detected anomaly via car navigation ECU 420. Anomaly detecting device 100 may be further equipped with a function of changing the protocol of an obtained frame and transferring the resulting frame to another network. For example, anomaly detecting device 100 may change the protocol of a frame obtained via CAN network 20 to the protocol used in at least one of FlexRay network 30 or Ethernet network 40 and transfer the resulting frame to the corresponding network. Anomaly detecting device 100 will be described later in further detail.

Flow generating device 210 monitors frames flowing over CAN network 20 and transmits flow information to anomaly detecting device 100. Flow generating device 210 and frames that flow over CAN network 20 will be described later in detail.

Steering ECU 220 is an ECU that controls the steering angle of the steering wheel of the vehicle (e.g., an automobile).

Body ECU 230 is an ECU that controls functions related to the vehicle's body, such as opening and closing of the windows.

Automatic drive ECU 240 is an ECU that implements automatic driving by instructing steering ECU 220, engine ECU 320, brake ECU 330, and camera ECU 430 to control the vehicle. In this example, the automatic drive ECU may be an automatic park ECU that controls automatic parking or a cruise control ECU that controls cruise control.

Automatic drive ECU 240 is connected to each of CAN network 20, FlexRay network 30, and Ethernet network 40. Automatic drive ECU 240 may be further equipped with a function of changing the protocol of an obtained frame and transferring the resulting frame to another network.

Flow generating device 310 monitors frames flowing over FlexRay network 30 and transmits flow information to anomaly detecting device 100. Flow generating device 310 has functions similar to those of flow generating device 210, and thus flow generating device 310 and flow generating device 210 may be called collectively as flow generating device 210 and so on in some cases. Frames that flow over FlexRay network 30 will be described later.

Engine ECU 320 is an ECU that controls acceleration of the vehicle speed.

Brake ECU 330 is an ECU that controls deceleration of the vehicle speed.

Flow generating device 410 monitors frames flowing over Ethernet network 40 and transmits flow information to anomaly detecting device 100. In this example, a Scalable Service-Oriented MiddlewarE over IP (SOME/IP) protocol is used in Ethernet network 40, and this SOME/IP protocol is a type of a service-oriented communication protocol. SOME/IP frames will be described later. Herein, flow generating device 410 has functions similar to those of flow generating device 210, and thus flow generating device 410 and flow generating device 210 may be called collectively as flow generating device 210 and so on in some cases. In this example, the protocol used in Ethernet network 40 is not limited to SOME/IP.

Car navigation ECU 420 is an ECU that controls output of a display provided in the vehicle.

Camera ECU 430 is an ECU that controls images to be captured by a camera provided in the vehicle.

Switch 440 is a device that switches frames that flow over the Ethernet.

Configuration Diagram of Anomaly Detecting Device 100

Figure 2:
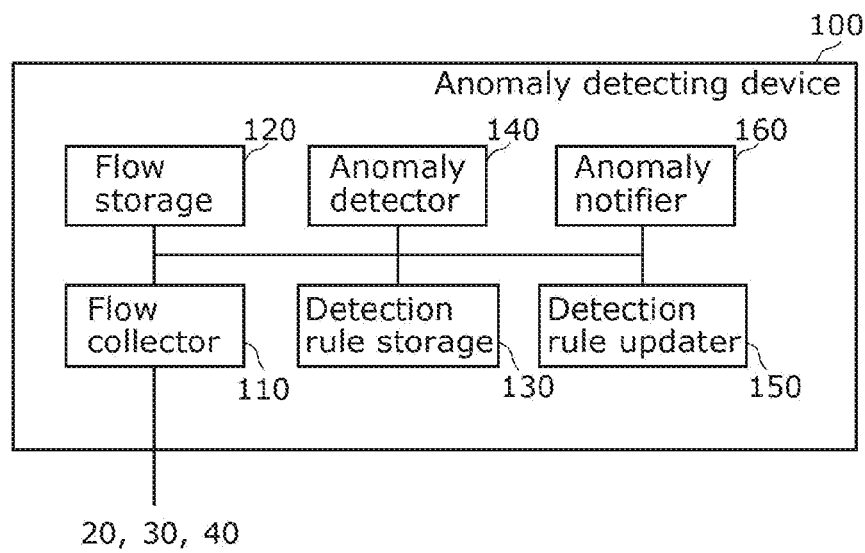
FIG. 2 is a diagram illustrating a functional configuration of an anomaly detecting device according to one embodiment.

FIG. 2 is a diagram illustrating a functional configuration of anomaly detecting device 100 according to the present embodiment.

As illustrated in FIG. 2, anomaly detecting device 100 includes flow collector 110, flow storage 120, detection rule storage 130, anomaly detector 140, detection rule updater 150, and anomaly notifier 160.

Flow collector 110 receives flow information from flow generating device 210 and so on via a corresponding one of CAN network 20, FlexRay network 30, and Ethernet network 40.

Flow storage 120 stores received flow information according to the protocols.

Detection rule storage 130 stores flow information corresponding to a normal state as a detection rule.

Anomaly detector 140 detects an anomaly in in-vehicle network system 10 based on flow information corresponding to a normal state indicated in a detection rule and flow information stored in flow storage 120. For example, anomaly detector 140 detects an anomaly by comparing flow information stored in flow storage 120 against flow information corresponding to a normal state. Anomaly detector 140 detects an anomaly in in-vehicle network system 10 based, for example, on whether flow information corresponding to a normal state and flow information stored in flow storage 120 satisfy a predetermined relationship. Anomaly detector 140 is an example of an anomaly determiner.

Detection rule updater 150 updates, via an external network, a detection rule stored in detection rule storage 130. This can be phrased also as that detection rule updater 150 updates a normal ratio based on information obtained via an external network. This information may include, for example, an updated detection rule or information indicating a difference from a detection rule stored in detection rule storage 130.

Anomaly notifier 160 notifies at least one of an external server or an occupant, such as the driver, of an anomaly when anomaly detector 140 has detected the anomaly. This can be phrased also as that anomaly notifier 160 notifies an occupant or a server external to the vehicle of an anomaly when anomaly detector 140 has determined that there is an anomaly.

Anomaly detecting device 100 configured as described above collects the amount of flow communication traffic, and this amount of flow communication traffic is information obtained by tallying the respective amounts of communication traffic of one or more frames classified based on the header information of the protocol. Anomaly detecting device 100 then calculates the ratio of the amounts of communication traffic over the respective networks based on the collected amount of flow communication traffic and compares the calculated ratio against the ratio of the amounts of communication traffic over the respective networks to be held in a normal state. Thus, anomaly detecting device 100 can determine the presence of an anomaly securely at a reduced cost without being equipped with anomaly detecting methods specific to the respective protocols. For example, anomaly detecting device 100 can constitute a part of, for example but not limited to, an automatic drive assistance system or an advanced driver assistance system.

The detection rule and the anomaly detecting method will be described later in detail.

Configuration Diagram of Flow Generating Device 210

Figure 3:
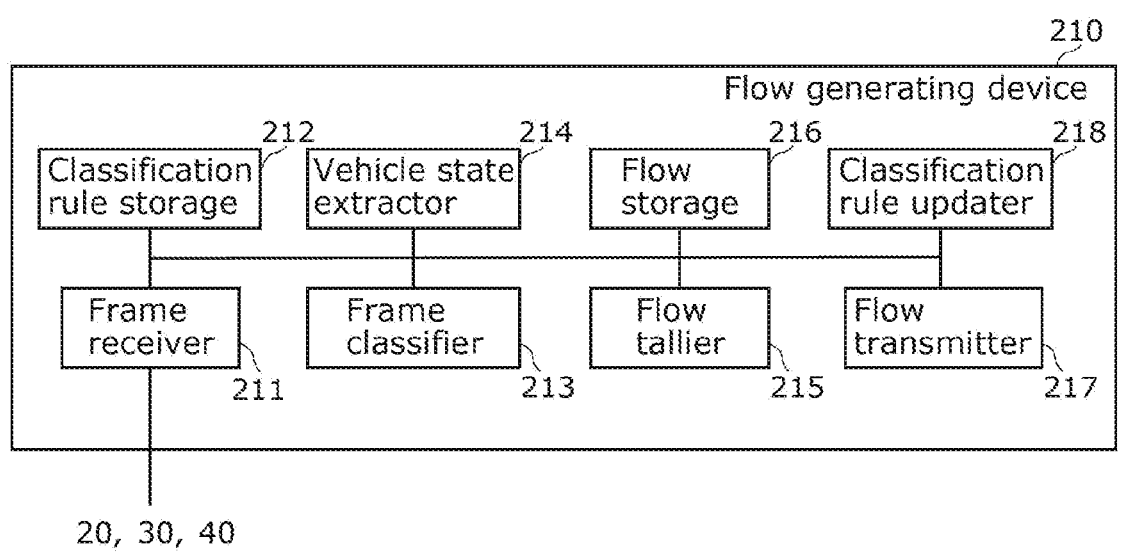
FIG. 3 is a diagram illustrating a functional configuration of a flow generating device according to one embodiment.

FIG. 3 is a diagram illustrating a functional configuration of flow generating device 210 according to the present embodiment. In this example, flow generating device 310 and flow generating device 410 each have a functional configuration similar to that of flow generating device 210.

As illustrated in FIG. 3, flow generating device 210 includes frame receiver 211, classification rule storage 212, frame classifier 213, vehicle state extractor 214, flow tallier 215, flow storage 216, flow transmitter 217, and classification rule updater 218.

Frame receiver 211 receives a frame that flows over a network.

Classification rule storage 212 stores a classification rule describing a method of classifying frames.

Frame classifier 213 classifies a received frame in accordance with a classification rule. Frame classifier 213 classifies an obtained frame by use of a classification rule that is based, for example, on header information of a protocol or protocols used in one or more networks. Moreover, frame classifier 213 may classify a frame based, for example, on a vehicle state in each of two or more networks, and the vehicle state may indicate that the vehicle is at least one of in automatic driving, in automatic parking, in cruise control, in software update, in vehicle diagnosis, or in internet communication connection.

Vehicle state extractor 214 extracts a vehicle state from a received frame. The vehicle state includes at least one of in automatic driving, in automatic parking, in cruise control, in software update, in vehicle diagnosis, or in internet communication connection.

Flow tallier 215 tallies the number of frames or the data size according to the flow type by use of classified frames, the extracted vehicle states, and the flow stored in flow storage 216. This can be phrased also as that flow tallier 215 tallies the amount of flow communication traffic, and the amount of flow communication traffic is information obtained by tallying the amounts of communication traffic of one or more frames classified by frame classifier 213. Tallying the number of frames or the data size according to the flow type is an example of tallying the number of frames or the data size according to the function.

Flow storage 216 stores a tallied flow.

Flow transmitter 217 transmits flow information to anomaly detecting device 100 at a predetermined timing. Flow information includes the amount of flow communication traffic.

Classification rule updater 218 updates a classification rule based on information obtained from an external network via anomaly detecting device 100. A classification rule is an example of a predetermined rule.

The classification rule, the method of tallying flows, and the method of transmitting a flow will be described later in detail.

One Example of Classification Rule

FIG. 4 is a table illustrating an example of a classification rule according to the present embodiment. This classification rule is stored in classification rule storage 212 of flow generating device 210. A classification rule is information used to append, to a frame, a classification label for classifying the frame. Meanwhile, the amount of flow communication traffic is information that is based on one or more frames classified according to the classification labels included in the classification rule illustrated in FIG. 4 described below.

As illustrated in FIG. 4, the classification rule includes the classification number, the protocol, the classification field, the classification label, and the enabled or disabled state.

The classification number provides a unique number corresponding to each classification rule. The protocol indicates the name of the protocol used in the corresponding network, and examples include CAN, CAN-FD, 31939, FlexRay, LIN, MOST, Ethernet, Ethernet (TCP/IP), Ethernet (SOME/IP), and Ethernet (DDS).

The classification field includes the field name and the verification value. The field name indicates the name of the field included in the header of the protocol for the network used in the classification. When a received frame has the value of the field that is identical to the verification value in the classification rule, this frame is given the classification label indicated in the classification label.

For example, the field name is the ID in the CAN protocol, the slot in the FlexRay protocol, or the message ID in the SOME/IP protocol. Since FlexRay identifies a frame by use of two units called a cycle and a slot, the slot according to the present disclosure is regarded as a slot that takes a cycle into consideration (e.g., a slot in a specific cycle).

The classification label includes, for example but not limited to, "all frames", "automatic drive ECU", "vehicle control", "software update", or "vehicle diagnosis". The label "all frames" means all the frames that flow in the CAN protocol. The label "automatic drive ECU" means that all the frames transmitted from an automatic drive ECU. The label "vehicle control" means a frame or frames related to the vehicle control. The label "software update" means a frame or frames related to the software update. The label "vehicle diagnosis" means a frame or frames related to the vehicle diagnosis.

The enabled or disabled state indicates whether the corresponding classification rule is enabled or disabled. Even when a received frame has the value of the field that is identical to the verification value in the classification rule, the classification label is not appended to this frame if the enabled or disabled state indicates that the classification rule is disabled.

As described above, the classification rule provides, for each of the protocols, associations among the field name included in the header information, the classification label, and the enabled or disabled state indicating whether appending of the classification label is enabled or disabled. Then, when the enabled or disabled state indicates that appending of a classification label is disabled, frame classifier 213 refrains from appending this classification label to the corresponding frame.

For example, in the CAN protocol, the rule indicates that, when a frame of which the ID field has the value of 21 is received, the classification label "all frames" is to be appended to this frame according to the classification rule with the classification number of 1. However, since the enabled or disabled state in that classification rule indicates such appending is disabled, and thus the classification label is not appended to this frame.

Meanwhile, the classification rule with the classification number of 3 indicates a rule stating that the classification labels "vehicle control" and "automatic drive ECU" are to be appended, and the enabled or disabled state indicates that such appending is enabled. Therefore, the two classification labels "vehicle control" and "automatic drive ECU" are appended to the aforementioned frame. In this manner, the number of the classification labels to be appended to a frame is not limited to one, and a plurality of classification labels may be appended to one frame.

Meanwhile, for example, for a frame of which the slot is 34 in the FlexRay protocol, the classification rule with the classification number of 6 indicates a rule stating that the classification label "all frames" is to be appended to this frame, and the enabled or disabled state indicates that such appending is enabled. Therefore, the classification label "all frames" is appended to this frame.

In this manner, classification labels consistent among the protocols are appended to frames of the respective protocols, and this makes it possible for higher anomaly detecting device 100 to integrally analyze the frames classified according to the same classification label or the flow that is information obtained by tallying such classified frames.

However, since information in the header for identifying a frame differs among the protocols, flow generating device 210 and so on need to retain classification rules for the respective protocols such as the one illustrated in FIG. 4. In this example, flow generating device 210 and so on may store the classification rule illustrated in FIG. 4 or store, of the classification rule illustrated in FIG. 4, only a portion corresponding to the protocol used in the network to which flow generating device 210, 310, or 410 is connected.

In the example described above, the classification rule is a rule for appending a classification label corresponding to the function of each frame, that is, for classifying a frame according to its function. This, however, is not a limiting example, and the classification rule may be a rule for classifying a frame according to its sender or its designated recipient.

One Example of CAN Frame

FIG. 5 is a table illustrating an example of a CAN frame according to the present embodiment. A CAN frame is a frame that flows over CAN network 20.

A CAN frame includes the ID, the data length, and the payload. The ID is used to identify the frame. The data length is used to grasp the data size of the payload in the frame. The ID and the data length are an example of header information. The payload indicates the content of the data in the frame identified by the ID.

For example, a CAN frame with the ID of 20 has a data length of 8 bytes, in which the first byte stores the counter, the second byte stores the automatic drive state, and the third to eighth bytes are unused. Meanwhile, a CAN frame with the ID of 22 has a data length of 8 bytes, in which the first byte stores the counter, the second to fifth bytes store update software data, and the eighth byte stores a flag value indicating that the update has been completed.

In this manner, flow generating device 210 can obtain the ID, the data length, and the payload when flow generating device 210 has received a CAN frame.

Meanwhile, for example, when flow generating device 210 has received a CAN frame with the ID of 20, flow generating device 210 can obtain information indicating whether the vehicle is in the automatic drive state, which is one of the vehicle states. Thus, when flow generating device 210 has received a CAN frame with the ID of 20, flow generating device 210 can obtain the vehicle state indicating whether the vehicle is in the automatic drive state or in the manual drive state. Meanwhile, when flow generating device 210 has received a CAN frame with the ID of 21, flow generating device 210 can obtain a speed command for accelerating or decelerating the vehicle to a target speed as well as the speed serving as the target speed. When flow generating device 210 has received a CAN frame with the ID of 22, flow generating device 210 can obtain update software data and an update complete flag indicating that the software update has been completed. When flow generating device 210 has received a CAN frame with the ID of 23, flow generating device 210 can obtain a diagnosis command directing the vehicle diagnosis and a diagnosis complete flag indicating that the vehicle diagnosis has been completed.

Even when the protocol is not CAN but CAN-FD or 31939, frames similar to the CAN frames illustrated in FIG. 5 are transmitted and received over the corresponding network.

One Example of FlexRay Frame

FIG. 6 is a table illustrating an example of a FlexRay frame according to the present embodiment. A FlexRay frame is a frame that flows over FlexRay network 30.

A FlexRay frame includes the slot, the data length, and the payload. The slot is used to identify the frame. The data length is used to grasp the data size of the payload. The slot and the data length are an example of header information. The payload indicates the content of the data in the frame identified by the ID. In this example, the cycle, which is one of the identifiers used in FlexRay, is omitted, and the slot that takes the cycle into consideration is referred to as a slot. In FIG. 6, the eighth byte represents the final byte of each payload.

For example, a FlexRay frame with the slot of 31 has a data length of 16 bytes, in which the first byte stores the counter, the second byte stores a steering command directing that the steering wheel of the vehicle be steered to a target steering angle, the third byte stores an angle serving as the target steering angle, and the fourth to sixteenth bytes are unused.

In this manner, flow generating device 310 can obtain the slot, the data length, and the payload when flow generating device 310 has received a FlexRay frame.

One Example of Ethernet (SOME/IP) Frame

FIG. 7 is a table illustrating an example of an Ethernet (SOME/IP) frame according to the present embodiment. An Ethernet frame is a frame that flows over Ethernet network 40. In the example described below, an Ethernet frame is transmitted by use of the SOME/IP protocol.

An Ethernet frame includes the MAC address, the IP address, the port, the message ID in the SOME/IP protocol, the data length, and the payload. The MAC address is assigned uniquely to each network device and indicates the MAC address of the sender (Src) and the MAC address of the designated recipient (Dst). The IP address is assigned to a network device according to the TCP/IP protocol and indicates the IP address of the sender (Src) and the IP address of the designated recipient (Dst). The port is assigned to an application of a network device and indicates the port of the sender (Src) and the port of the designated recipient (Dst).

The payload in the TCP/IP protocol includes the header and the payload in the SOME/IP protocol. The header in SOME/IP indicates the message ID and the data length, and the content of the payload is identified by the message ID. The message ID and the data length are an example of header information.

The payload includes, for example but not limited to, the automatic drive state, a camera control command, image data, update software data, an update complete flag, a diagnosis code, and a diagnosis complete flag. For example, in a frame with the message ID in SOME/IP of 41, the MAC address of the sender (Src) is M1, the MAC address of the designated recipient (Dst) is M2, the IP address of the sender (Src) is IP1, the IP address of the designated recipient (Dst) is IP2, the port of the sender (Src) is P13, the port of the designated recipient (Dst) is P22, the data length of SOME/IP is 512 bytes, and the payload includes a camera control command and image data.

Meanwhile, when a DDS protocol is used instead of the SOME/IP protocol, a topic number or a Globally Unique Identifier (GUID) is included instead of the message ID.

In this manner, flow generating device 410 can obtain the MAC address, the IP address, the port, and the message ID, the data length, and the payload in the SOME/IP protocol when flow generating device 410 has received an Ethernet frame.

One Example of Flow Tally

FIG. 8 is a table illustrating an example of a flow tally according to the present embodiment. A flow tally is held in flow generating device 210 and so on and transmitted to anomaly detecting device 100. In this example, FIG. 8 illustrates a flow tally obtained from each of flow generating device 210 and so on and stored in flow storage 120 of anomaly detecting device 100.

As illustrated in FIG. 8, the flow tally includes the protocol, the flow type, the tally of the number of frames, the tally of the data size, and the transmission condition.

The protocol indicates, in advance, the protocol used in the corresponding network, such as CAN, FlexRay, or SOME/IP in Ethernet.

The flow type indicates, in advance, the flow type consistent among the protocols used in higher anomaly detecting device 100. The flow type includes, for example but not limited to, "all frames in automatic driving", "automatic drive ECU", "vehicle control", "software update", and "vehicle diagnosis". The flow type is an example of the function of the flow.

The tally of the number of frames indicates the tally of the number of the frames that correspond to the given flow type, of the frames received by flow generating device 210.

The tally of the data size indicates the tally of the data length of the payload or payloads in the frame or frames that correspond to the given flow type, of the frames received by flow generating device 210. The flow type is indicated in advance. Whether the flow type of a received frame matches a given flow type is determined by use of the classification label of the received frame. For example, whether the flow type of a received frame matches a given flow type may be determined by use of the classification label and the vehicle state of the received frame. The process of tallying the flows will be described later in detail.

The transmission condition is set in advance for each flow type. The transmission condition includes, for example, "passage of 10 minutes" meaning that the flow is to be transmitted when 10 minutes has passed since the initial tallying, "update complete" meaning that the flow is to be transmitted after the software update has been completed, and "diagnosis complete" meaning that the flow is to be transmitted after the vehicle diagnosis has been completed.

For example, in the flow with the type "all frames in automatic driving" in the FlexRay protocol, the tally of the number of frames is 100, the total value of the data size is 1600 bytes, and this flow is transmitted to anomaly detecting device 100 at a timing that is 10 minutes past the time of initial tallying.

Meanwhile, for example, in the flow with the type "software update" in the Ethernet (SOME/IP) protocol, the tally of the number of frames is 10, the tally of the data size is 1280, and the flow is transmitted to anomaly detecting device 100 at a timing when the software update is completed.

In this manner, Ethernet (SOME/IP) has a greater maximum data length that can be transmitted in one frame than CAN or FlexRay. Therefore, Ethernet (SOME/IP) may have a small tally of the number of frames even when the tally of the data size is large. Moreover, in Ethernet (SOME/IP), when a frame related to the vehicle control is not transmitted, the tally of the number of frames and the tally of the data size are constantly zero.

Anomaly detecting device 100 receives the flow tallies for the respective protocols from flow generating devices 210, 310, and 410 and stores the received flow tallies. Therefore, anomaly detecting device 100 can use the flow tallies obtained for the respective protocols to detect an anomaly.

For example, for the flow with the type "all frames in automatic driving" in the CAN protocol, the tally of the number of frames is 10, and the tally of the data size is 80 bytes. For the flow with the type "all frames in automatic driving" in the FlexRay protocol, the tally of the number of frames is 100, and the total value of the data size is 1600 byte. For the flow with the type "all frames in automatic driving" in the Ethernet (SOME/IP) protocol, the tally of the number of frames is 10000, and the tally of the data size is 320000 bytes. Therefore, the ratio of the tally of the number of frames in the CAN protocol to the tally of the number of frames in the FlexRay protocol to the tally of the number of frames in the Ethernet (SOME/IP) protocol can be calculated to be 1:10:1000.

In a similar manner, the ratio of the tally of the data size in the CAN protocol to the tally of the data size in the FlexRay protocol to the tally of the data size in the Ethernet (SOME/IP) protocol can be calculated to be 1:20:4000. In this manner, as the flow tallies of the respective protocols are collected at one location, the ratio of the tallies of the numbers of frames in the respective protocols and the ratio of the tallies of the data sizes in the respective protocols can be calculated.

When a plurality of networks use the same protocol, the flows are tallied for each network. Thus, even when a plurality of networks use the same protocol, the ratio of the tallies of the numbers of frames in the respective networks and the ratio of the tallies of the data sizes in the respective networks can be calculated.

In this example, the tally of the number of frames and the tally of the data size illustrated in FIG. 8 are calculated based on the frames obtained within a predetermined period.

FIG. 8 illustrates a classification rule to be used when the frames are classified according to the flow type (one example of the function of the flow). When the frames are classified according to the sender or the designated recipient, the classification rule includes information indicating the sender or the designated recipient in place of the flow type in the classification rule illustrated in FIG. 8.

One Example of Detection Rule

FIG. 9 is a table illustrating an example of a detection rule according to the present embodiment. A detection rule is a rule that anomaly detecting device 100 uses to detect an anomaly.

As illustrated in FIG. 9, a detection rule includes the flow type, the frame count ratio by protocol, and the data size ratio by protocol. The detection rule includes the frame count ratio by protocol in a normal state for each flow type and the data size ratio by protocol in a normal state for each flow type. These ratios in a normal state are obtained in advance as they are set in advance or learned mechanically, and held in detection rule storage 130. The frame count ratios by protocol and the data size ratios by protocol illustrated in FIG. 9 are determined based on the frames obtained within a predetermined period.

In this example, each frame count ratio by protocol in a normal state illustrated in FIG. 9 indicates the ratio of the numbers of frames of the respective protocols transmitted and received in in-vehicle network system 10 when no anomaly is being detected (e.g., when no cyberattack is underway). Meanwhile, each data size ratio by protocol in a normal state indicates the ratio of the data sizes of the respective protocols transmitted and received in in-vehicle network system 10 when no anomaly is being detected (e.g., when no cyberattack is underway).

The frame count ratio by protocol and the data size ratio by protocol are each an example of a normal ratio. It suffices that the detection rule include at least one of the frame count ratio by protocol or the data size ratio by protocol.

Anomaly detecting device 100 receives the flow tally counted according to the protocols and calculates at least one of the current frame count ratio by protocol for each flow type (one example of an observed ratio) or the current data size ratio by protocol for each flow type (one example of the observed ratio). According to the present embodiment, anomaly detecting device 100 calculates both the frame count ratio by protocol and the data size ratio by protocol. Then, anomaly detecting device 100 detects an anomaly by, for example, comparing the calculated ratio or ratios against the ratio or ratios to be held in a normal state as indicated in the detection rule.

For example, in the example of the flow tally illustrated in FIG. 8, for the flow with the type "all frames in automatic driving", the ratio of the tally of the number of frames in the CAN protocol to the tally of the number of frames in the FlexRay protocol to the tally of the number of frames in the Ethernet (SOME/IP) protocol is 1:10:1000, and the ratio of the tallies of the data sizes is 1:20:4000. This ratio of the tallies of the numbers of frames, 1:10:1000, and this ratio of the tallies of the data sizes, 1:20:4000, are each an example of the observed ratio.

Meanwhile, in the detection rule, for the flow with the type "all frames in automatic driving", the ratio of the tally of the number of frames in the CAN protocol to the tally of the number of frames in the FlexRay protocol to the tally of the number of frames in the Ethernet (SOME/IP) protocol is 1:10:1000, and the ratio of the tallies of the data sizes is 1:20:4000. This ratio of the tallies of the numbers of frames, 1:10:1000, and this ratio of the tallies of the data sizes, 1:20:4000, are each an example of the normal ratio. In the above case, anomaly detector 140 can determine that all the protocols are normal since the observed ratio matches the normal ratio.

Meanwhile, in the example of the flow tally illustrated in FIG. 8, for the flow with the type "vehicle diagnosis", the ratio of the tally of the number of frames in the CAN protocol to the tally of the number of frames in the FlexRay protocol to the tally of the number of frames in the Ethernet (SOME/IP) protocol is 1:2:1, and the ratio of the tallies of the data sizes is 1:2:1. This ratio of the tallies of the numbers of frames, 1:2:1, and this ratio of the tallies of the data sizes, 1:2:1, are each an example of the observed ratio.

Meanwhile, in the detection rule, for the flow with the type "all frames in automatic driving", the ratio of the tally of the number of frames in the CAN protocol to the tally of the number of frames in the FlexRay protocol to the tally of the number of frames in the Ethernet (SOME/IP) protocol is 1:1:1, and the ratio of the tallies of the data sizes is 1:1:1. This ratio of the tallies of the numbers of frames, 1:1:1, and this ratio of the tallies of the data sizes, 1:1:1, are each an example of the normal ratio.

The number of frames and the data size for "vehicle diagnosis" in the FlexRay protocol are greater than those to be held in a normal state. In other words, the ratio between CAN and Ethernet (SOME/IP) is appropriate, and thus anomaly detector 140 can determine that FlexRay is experiencing an anomaly as the possibility that an anomaly is occurring in FlexRay is high.

For example, anomaly detector 140 may calculate a ratio in which the values in the current ratio are divided by the corresponding values in the ratio by protocol to be held in a normal state and determine that there is an anomaly when the values corresponding to the respective protocols in the calculated ratio differ from one another by a threshold or more. Moreover, anomaly detector 140 may determine that an anomaly has occurred in the protocol with the largest difference. For example, when the ratio of the tally of the number of frames in CAN to the tally of the number of frames in FlexRay to the tally of the number of frames in Ethernet (SOME/IP) in a normal state is 1:10:1000 and when the current ratio is 1:20:950, the ratio of the values resulting from the division described above is (1/1):(20/10):(950/1000)=1:2:0.95.

For example, when the threshold is set to 1, anomaly detector 140 determines that there is an anomaly since there is a difference of 1 or more between the values corresponding to the respective protocols in the resulting ratio and can determine that there is an anomaly in the FlexRay protocol that has the largest difference. That there is a difference of 1 or more is an example of that the values differ from each other at a predetermined rate or higher.

In this example, anomaly detector 140 may determine only the presence of an anomaly and does not have to determine the protocol where the anomaly is present.

As described above, anomaly detecting device 100 includes flow collector 110 and anomaly detector 140. Flow collector 110 collects the amount of flow communication traffic in each of CAN network 20, FlexRay network 30, and Ethernet network 40 in in-vehicle network system 10 that includes CAN network 20 FlexRay network 30, and Ethernet network 40 (one example of two or more networks). The amount of flow communication traffic is information obtained by tallying the amount of communication traffic of one or more frames classified according to the classification rule (one example of the predetermined rule) that is based on the header information of the protocols (the network protocols). Anomaly detector 140 calculates an observed ratio based on the amount of flow communication traffic, and the observed ratio is a ratio of the amount of communication traffic in CAN network 20, the amount of communication traffic in FlexRay network 30, and the amount of communication traffic in Ethernet network 40. Then, anomaly detector 140 determines whether CAN network 20, FlexRay network 30, or Ethernet network 40 is anomalous based on the calculated observed ratio and a normal ratio that is the ratio of the amount of communication traffic in CAN network 20 to the amount of communication traffic in FlexRay network 30 to the amount of communication traffic in Ethernet network 40 to be held in a normal state.

With this configuration, an anomaly in communication in in-vehicle network system 10 can be detected with a simple configuration. Furthermore, one of the expected advantageous effects is that collecting only the tally of the amount of communication traffic can reduce the amount of communication traffic of frames flowing over the network for anomaly detection. Additionally, another expected advantageous effect is that anomaly can be detected by comparing the amount of communication traffic between the networks to capture an increase in the amount of communication traffic that can be observed when, for example, an attack of transmitting a frame while spoofing as a legitimate ECU or a DDoS attack of preventing execution of a service is executed.

As described above, anomaly detector 140 may determine that CAN network 20, FlexRay network 30, or Ethernet network 40 is anomalous if, for example, the observed ratio and the normal ratio differ from each other at a predetermined rate or higher. CAN network 20, FlexRay network 30, and Ethernet network 40 may each communicate by use of a different network protocol. The observed ratio may be a ratio of the amounts of communication traffic in two or more protocols calculated based on the amount of flow communication traffic. For example, anomaly detector 140 may determine that, of the two or more protocols, the protocol where the observed ratio and the normal ratio differ from each other at the highest rate is anomalous. The normal ratio may be the ratio of the amounts of communication traffic in the two or more protocols calculated based on the amount of flow communication traffic to be held in a normal state. Determining that a given protocol is anomalous makes it possible to determine that CAN network 20, FlexRay network 30, or Ethernet network 40 that uses this protocol is anomalous, for example.

In this example, anomaly detector 140 may determine an anomalous network based on the detection rule. For example, anomaly detector 140 may determine that an anomaly has occurred in, among CAN network 20, FlexRay network 30, and Ethernet network 40, the network where the observed ratio and the normal ratio differ from each other at the highest rate.

As described above, the anomaly detecting system is an anomaly detecting system in in-vehicle network system 10 that includes CAN network 20, FlexRay network 30, and Ethernet network 40. The anomaly detecting system includes anomaly detecting device 100 and flow generating device 210 and so on. Flow generating device 210 and so on are connected to one or more networks of CAN network 20, FlexRay network 30, and Ethernet network 40 and collect the amount of flow communication traffic. Flow generating device 210 and so on each include frame receiver 211 (one example of a frame obtainer), frame classifier 213, flow tallier 215, and flow transmitter 217. Frame receiver 211 obtains a frame in the one or more networks. Frame classifier 213 classifies the obtained frame according to the classification rule (one example of the predetermined rule) that is based on the header information of the protocols used in the one or more networks. Flow tallier 215 tallies the amount of flow communication traffic, and the amount of flow communication traffic is information obtained by tallying the amount of communication traffic of one or more frames classified by frame classifier 213. Flow transmitter 217 transmits the tallied amount of flow communication traffic to anomaly detecting device 100.

Sequences of Processes

Figure 10:
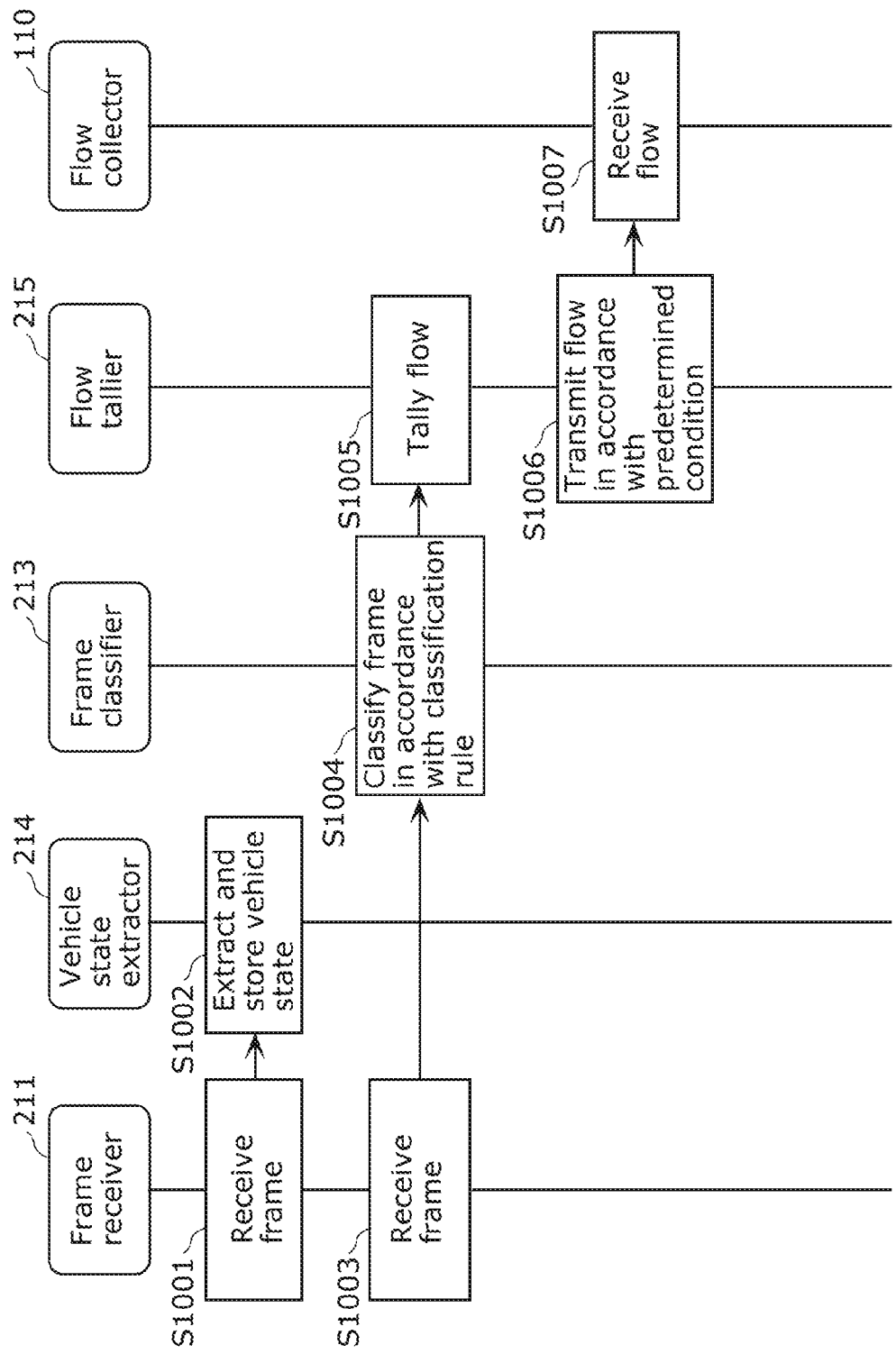
FIG. 10 is a diagram illustrating a sequence of processes performed from the reception of a frame to the transmission of a flow according to one embodiment.
Figure 11:
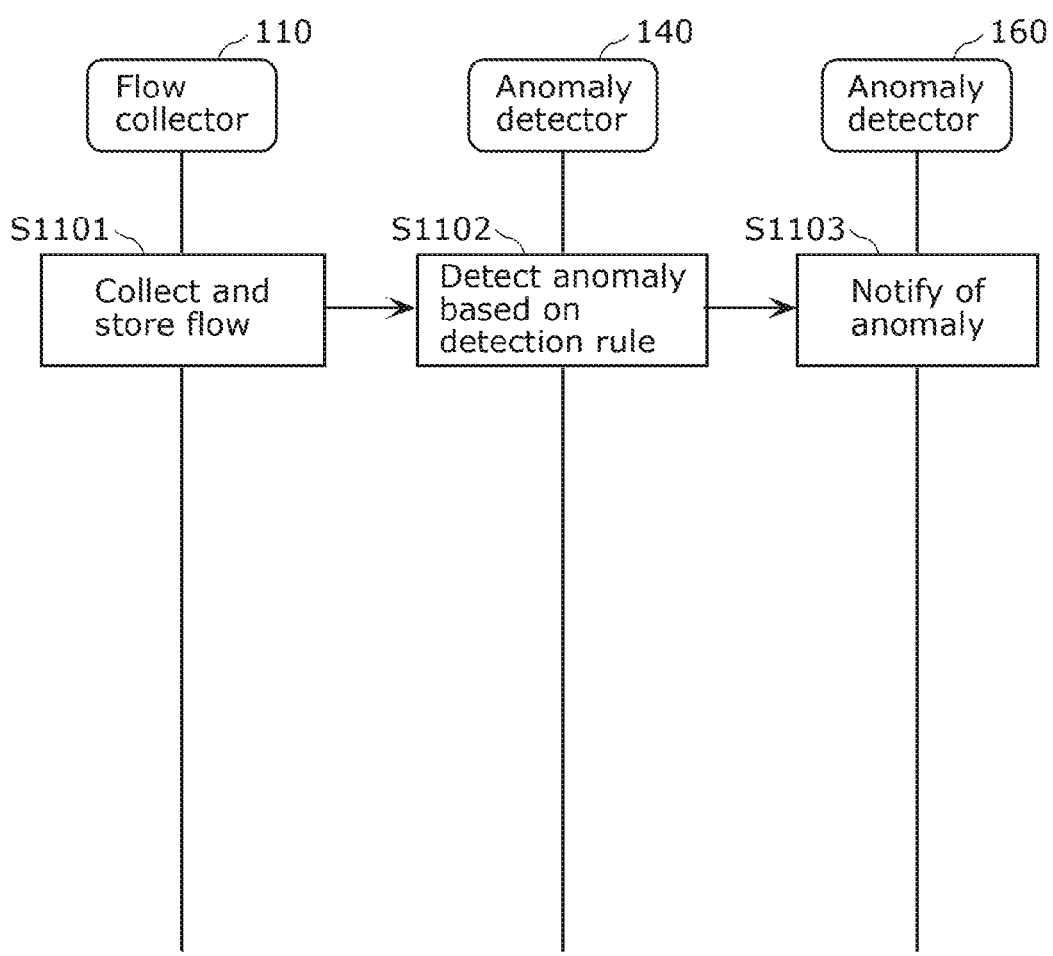
FIG. 11 is a diagram illustrating a sequence of processes performed from the reception of a flow to the notification of an anomaly according to one embodiment.

FIG. 10 is a diagram illustrating a sequence of processes performed from the reception of a frame to the transmission of a flow according to the present embodiment. FIG. 11 is a diagram illustrating a sequence of processes performed from the reception of a flow to the notification of an anomaly according to the present embodiment. FIG. 10 and FIG. 11 illustrate sequences of processes performed from when flow generating device 210 according to the present embodiment receives a frame and transmits a flow tally to anomaly detecting device 100 to when anomaly detecting device 100 receives the flow tally and provides a notification regarding an anomaly. In the following section, processes performed by flow generating device 210 will be described. The processes at step S1001 to step S1006 illustrated in FIG. 10 are performed in a similar manner in flow generating device 310 and flow generating device 410 as well.

First, FIG. 10 will be described.

(S1001) Frame receiver 211 of flow generating device 210 receives a frame that flows over a network and transmits the frame to vehicle state extractor 214.

(S1002) Next, if the frame includes a vehicle state, vehicle state extractor 214 extracts the vehicle state and stores the extracted vehicle state as the current vehicle state. The vehicle state includes, for example, at least one of in automatic driving, in automatic parking, in cruise control, in software update, in vehicle diagnosis, or in internet communication connection, and the vehicle state is extracted from a received frame.

(S1003) As in S1001, frame receiver 211 receives a frame that flows over a network. If the frame includes no vehicle state, frame receiver 211 transmits this frame to frame classifier 213.

In this manner, frame receiver 211 determines whether a received frame includes a vehicle state and determines where this frame is to be transmitted to in accordance with the result of the determination.

(S1004) Next, frame classifier 213 classifies the frame in accordance with the classification rule (e.g., appends a classification label to the received frame) and transmits the frame to flow tallier 215. Meanwhile, frame classifier 213 discards a frame that does not conform to any classification rule. In other words, no frame that fails to conform to the classification rule is transmitted to flow tallier 215.

(S1005) Next, flow tallier 215 receives the frame to which the classification label has been appended and obtains the current vehicle state stored in vehicle state extractor 214. If the flow type of the received frame matches an existing flow type, flow tallier 215 tallies at least one of the number of frames or the data size of the received frame and updates the flow tally stored in flow storage 216. Flow tallier 215 performs at least one of tallying the number of frames or tallying the data size at step S1005.

For example, if the current vehicle state indicates that the vehicle is in automatic driving, flow tallier 215 obtains the tally of the number of frames and the tally of the data sizes of all the frames received within a period from when the automatic drive state in the vehicle state (the vehicle state that is based on the field indicated in FIG. 5 if the frame is a CAN frame) has become ON to when the automatic drive state has become OFF, and sets these tallies as the tally of the number of frames and the tally of the data size under the flow type "all frames in automatic driving" indicated in FIG. 8. In this example, this tallying is performed in a similar manner for the other vehicle states as well.

(S1006) Flow transmitter 217 transmits the flow (the flow tally) to anomaly detecting device 100 in accordance with a predetermined condition. Flow transmitter 217, for example, checks the transmission condition stored in flow storage 216 each time the flow tally is updated, and if the transmission condition is satisfied, flow transmitter 217 transmits the flow tally to anomaly detecting device 100. Then, flow transmitter 217 updates the tally of the transmitted flow to zero.

(S1007) Next, flow collector 110 of anomaly detecting device 100 receives the flow (the flow tally) from flow generating device 210.

The flow tally may be information obtained by tallying the amount of communication traffic including at least either of the number of frames or the data size of one or more frames in each of CAN network 20, FlexRay network 30, and Ethernet network 40 (an example of two or more networks), and the one of more frames may be classified according to the function based on the ID if the protocol (the network protocol) is CAN, CAN-FD, or 31939, classified according to the function based on the cycle and the slot if the protocol is FlexRay, classified according to the function based on the MAC address, the IP address, or the port number if the protocol is Ethernet, classified according to the function based on the message ID if the protocol is SOME/IP, or classified according to the function based on the topic IP or the GUID if the protocol is DDS.

Moreover, as described above, the flow tally may be information obtained by tallying the amount of communication traffic including at least either of the number of frames or the data size of one or more frames in each of CAN network 20, FlexRay network 30, and Ethernet network 40, and the one or more frames may be classified according to the sender or the designated recipient based on the ID if the protocol is CAN, CAN-FD, or 31939, classified according to the sender or the designated recipient based on the cycle and the slot if the protocol is FlexRay, classified according to the sender or the designated recipient based on the MAC address, the IP address, or the port number if the protocol is Ethernet, classified according to the sender or the designated recipient based on the message ID if the protocol is SOME/IP, or classified according to the sender or the designated recipient based on the topic IP or the GUID if the protocol is DDS. The flow tally can be said to classify the frames according to the ECU.

In this example, the function, the sender, and the designated recipient are determined in advance.

Meanwhile, the amount of flow communication traffic may be information obtained by tallying, in each of CAN network 20, FlexRay network 30, and Ethernet network 40, the amount of communication traffic including at least either of the number of frames or the data size of one or more frames within a period corresponding to a vehicle state including at least one of in automatic driving, in automatic parking, in cruise control, in software update, in vehicle diagnosis, and in internet communication connection.

Now, FIG. 11 will be described.

(S1101) Flow collector 110 of anomaly detecting device 100 receives the flow tally transmitted at step S1006 and stores the flow tally into flow storage 120 according to the protocol. Receiving the flow tally is an example of collecting a flow.

(S1102) Anomaly detector 140 makes a determination of an anomaly based on the flow tally in accordance with the detection rule stored in detection rule storage 130. Making a determination of an anomaly includes determining the presence of an anomaly, for example. Then, if an anomaly has been detected, flow transmitter 217 notifies anomaly notifier 160 of the anomaly (e.g., transmits information indicating that the anomaly has been detected).

(S1103) Next, anomaly notifier 160 notifies an occupant or an external server of the anomaly.

Flowchart of Frame Classification Process

Figure 12:
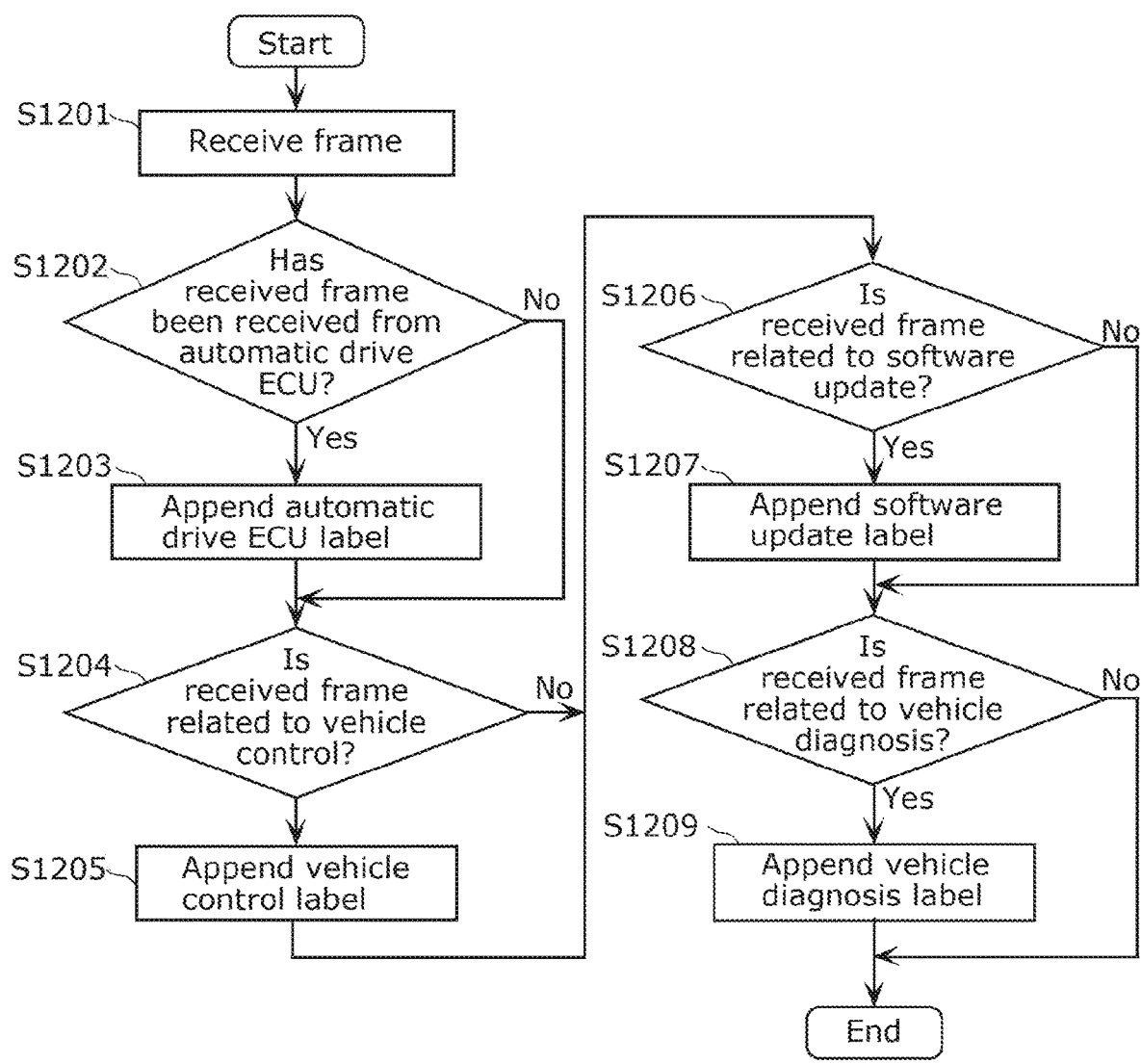
FIG. 12 illustrates a flowchart of a frame classification process according to one embodiment.

FIG. 12 illustrates a flowchart of a frame classification process according to the present embodiment. The frame classification process is executed by flow generating device 210.

(S1201) Frame receiver 211 of flow generating device 210 receives a frame that flows over a network.

(S1202) Next, frame classifier 213 determines whether the received frame is a frame transmitted from an automatic drive ECU based on the classification rule determined for each protocol. If the received frame is a frame transmitted from the automatic drive ECU (Yes at S1202), frame classifier 213 performs step S1203. Meanwhile, if the received frame is not a frame transmitted from the automatic drive ECU (No at S1202), frame classifier 213 performs step S1204.

(S1203) Next, frame classifier 213 appends the automatic drive ECU label to the received frame and performs step S1204.

(S1204) Next, frame classifier 213 determines whether the received frame is a frame related to the vehicle control based on the classification rule determined for each protocol. If the received frame is a frame related to the vehicle control (Yes at S1204), frame classifier 213 performs step S1205. Meanwhile, if the received frame is not a frame related to the vehicle control (No at S1204), frame classifier 213 performs step S1206.

(S1205) Next, frame classifier 213 appends the vehicle control label to the received frame and performs step S1206.

(S1206) Next, frame classifier 213 determines whether the received frame is a frame related to the software update based on the classification rule determined for each protocol. If the received frame is a frame related to the software update (Yes at S1206), frame classifier 213 performs step S1207. Meanwhile, if the received frame is not a frame related to the software update (No at S1206), frame classifier 213 performs step S1208.

(S1207) Frame classifier 213 appends the software update label to the received frame and performs step S1208.

(S1208) Frame classifier 213 determines whether the received frame is a frame related to the vehicle diagnosis based on the classification rule determined for each protocol. If the received frame is a frame related to the vehicle diagnosis (Yes at S1208), frame classifier 213 performs step S1209. Meanwhile, if the received frame is not a frame related to the vehicle diagnosis (No at S1208), frame classifier 213 terminates the process.

(S1209) Frame classifier 213 appends the vehicle diagnosis label to the received frame and terminates the process.

The determination processes performed in steps S1202, S1204, S1206, and S1208 described above are each performed by use of the classification rule illustrated in FIG. 4. For example, frame classifier 213 may classify the frame according to the function based on the ID if the network protocol is CAN, CAN-FD, or 31939, classify the frame according to the function based on the cycle and the slot if the network protocol is FlexRay, classify the frame according to the function based on the MAC address, the IP address, or the port number if the network protocol is Ethernet, classify the frame according to the function based on the message ID if the network protocol is SOME/IP, or classify the frame according to the function based on the topic IP or the GUID if the network protocol is DDS, in each of CAN network 20, FlexRay network 30, and Ethernet network 40. Alternatively, for example, frame classifier 213 may classify the frame according to the sender or the designated recipient based on the ID if the network protocol is CAN, CAN-FD, or 31939, classify the frame according to the sender or the designated recipient based on the cycle and the slot if the network protocol is FlexRay, classify the frame according to the sender or the designated recipient based on the MAC address, the IP address, or the port number if the network protocol is Ethernet, classify the frame according to the sender or the designated recipient based on the message ID if the network protocol is SOME/IP, or classify the frame according to the sender or the designated recipient based on the topic IP or the GUID if the network protocol is DDS, in each of CAN network 20, FlexRay network 30, and Ethernet network 40.

In this example, if the determination in at least one of step S1202 or step S1204 is Yes, frame classifier 213 may refrain from performing the processes at and after step S1206. Meanwhile, although it is preferable that, of the determination processes at steps S1202, S1204, S1206, and S1208, the determination processes at step S1202 and S1204 be performed before the determination processes at steps S1206 and S1208, the order of the determination processes is not limited to this example.

In this example, the processes at and after step S1202 may be performed each time a frame is received or performed when a predetermined number of frames have been accumulated.

As described above, classifying a frame according to the flow type is an example of classifying a frame according to the function of the flow.

Flowchart of Flow Tallying Process

Figure 13:
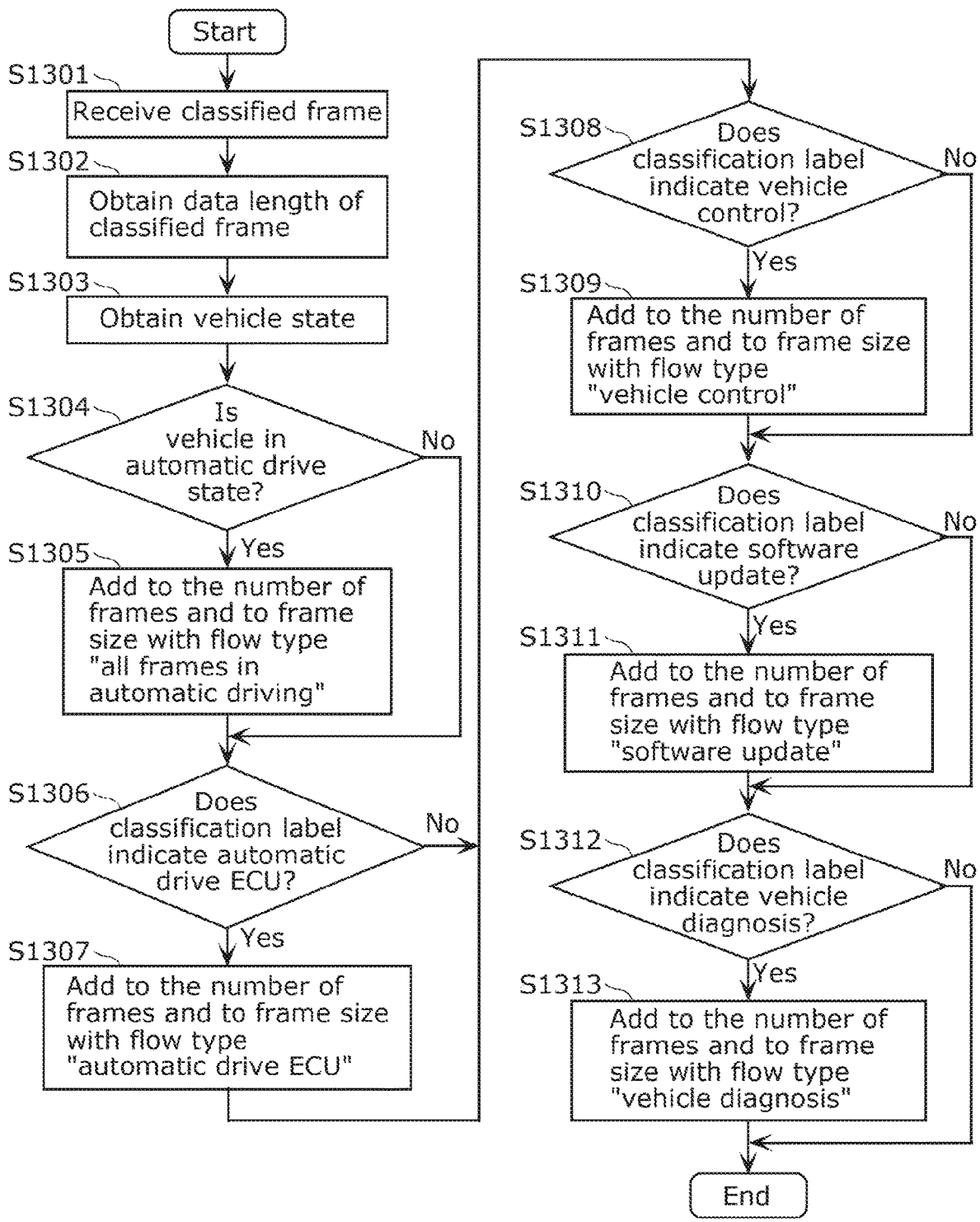
FIG. 13 illustrates a flowchart of a flow tallying process according to one embodiment.

FIG. 13 illustrates a flowchart of a flow tallying process according to the present embodiment. In the following section, processes performed by flow generating device 210 will be described. The processes illustrated in FIG. 13 are performed in a similar manner in flow generating device 310 and flow generating device 410 as well.

(S1301) Flow tallier 215 of flow generating device 210 receives, from frame classifier 213, a classified frame to which a classification label has been appended and performs step S1302.

(S1302) Next, flow tallier 215 obtains the data length of the classified frame and performs step S1303.

(S1303) Next, flow tallier 215 obtains the current vehicle state from vehicle state extractor 214 and performs step S1304. The current vehicle state may be, for example, the latest vehicle state.

(S1304) Next, flow tallier 215 determines whether the vehicle state indicates that the vehicle is in automatic driving. If the vehicle state indicates that the vehicle is in automatic driving (Yes at S1304), flow tallier 215 performs step S1305. Meanwhile, if the vehicle state indicates that the vehicle is not in automatic driving (No at S1304), flow tallier 215 performs step S1306.

In this example, the process of flow tallier 215 in step S1304 is not limited to making a determination as to whether the vehicle is in automatic driving, and as long as a determination related to the vehicle state is made in step S1304, flow tallier 215 may perform a process of determining as to at least one selected from or a combination of two or more selected from in automatic driving, in automatic parking, in cruise control, in software update, in vehicle diagnosis, and in internet communication connection.

(S1305) Next, flow tallier 215 adds one to the tally of the number of frames with the flow type "all frames in automatic driving" and adds the data length of the classified frame to the tally of the frame size with the flow type "all frames in automatic driving", in the flow tally stored in flow storage 216. Then, flow tallier 215 performs step S1306.

(S1306) Next, flow tallier 215 determines whether the classification label of the classified frame indicates the automatic drive ECU. If the classification label of the classified frame indicates the automatic drive ECU (Yes at S1306), flow tallier 215 performs step S1307. Meanwhile, if the classification label of the classified frame does not indicate the automatic drive ECU (No at S1306), flow tallier 215 performs step S1308.

(S1307) Next, flow tallier 215 adds one to the tally of the number of frames with the flow type "automatic drive ECU" and adds the data length of the classified frame to the tally of the frame size with the flow type "automatic drive ECU", in the flow tally stored in flow storage 216. Then, flow tallier 215 performs step S1308.

(S1308) Next, flow tallier 215 determines whether the classification label of the classified frame indicates the vehicle control. If the classification label of the classified frame indicates the vehicle control (Yes at S1308), flow tallier 215 performs step S1309. Meanwhile, if the classification label of the classified frame does not indicate the vehicle control (No at S1308), flow tallier 215 performs step S1310.

(S1309) Next, flow tallier 215 adds one to the tally of the number of frames with the flow type "vehicle control" and adds the data length of the classified frame to the tally of the frame size with the flow type "vehicle control", in the flow tally stored in flow storage 216. Then, flow tallier 215 performs step S1310.

(S1310) Next, flow tallier 215 determines whether the classification label of the classified frame indicates the software update. If the classification label of the classified frame indicates the software update (Yes at S1310), flow tallier 215 performs step S1311. Meanwhile, if the classification label of the classified frame does not indicate the software update (No at S1310), flow tallier 215 performs step S1312.

(S1311) Next, flow tallier 215 adds one to the tally of the number of frames with the flow type "software update" and adds the data length of the classified frame to the tally of the frame size with the flow type "software update", in the flow tally stored in flow storage 216. Then, flow tallier 215 performs step S1312.

(S1312) Next, flow tallier 215 determines whether the classification label of the classified frame indicates the vehicle diagnosis. If the classification label of the classified frame indicates the vehicle diagnosis (Yes at S1312), flow tallier 215 performs step S1313. Meanwhile, if the classification label of the classified frame does not indicate the vehicle diagnosis (No at S1312), flow tallier 215 terminates the tallying process.

(S1313) Next, flow tallier 215 adds one to the tally of the number of frames with the flow type "vehicle diagnosis" and adds the data length of the classified frame to the tally of the frame size with the flow type "vehicle diagnosis", in the flow tally stored in flow storage 216. Then, flow tallier 215 terminates the tallying process.

With the above configuration, flow tallier 215 can obtain the tally of the number of frames and the tally of the data sizes of all the frames received within a period from when the automatic drive state has become ON to when the automatic drive state has become OFF as the tally of the number of frames with the flow type "all frames in automatic driving" indicated in FIG. 8 and the tally of the data sizes with the flow type "all frames in automatic driving" indicated in FIG. 8. Moreover, flow tallier 215 can obtain the tally of the number of frames and the tally of the data sizes of all the frames received within a period from when the software update state has become ON to when the software update state has become OFF as the tally of the number of frames with the flow type "software update" indicated in FIG. 8 and the tally of the data sizes with the flow type "software update" indicated in FIG. 8. Moreover, flow tallier 215 can obtain the tally of the number of frames and the tally of the data sizes of all the frames received within a period from when the vehicle diagnosis has become ON to when the vehicle diagnosis has become OFF as the tally of the number of frames with the flow type "vehicle diagnosis" indicated in FIG. 8 and the tally of the data sizes with the flow type "vehicle diagnosis" indicated in FIG. 8. In this example, the period from when the automatic drive state has become ON to when the automatic drive state has become OFF, the period from when the software update state has become ON to when the software update state has become OFF, and the period from when the vehicle diagnosis has become ON to when the vehicle diagnosis has become OFF are each one example of a period corresponding to a vehicle state.

Furthermore, flow tallier 215 can obtain the tally of the number of frames and the tally of the data sizes of all the frames related to the automatic drive ECU as well as the tally of the number of frames and the tally of the data sizes of all the frames related to the vehicle control as, respectively, the tally of the number of frames and the tally of the data sizes with the flow type "automatic drive ECU" indicated in FIG. 8 as well as the tally of the number of frames and the tally of the data sizes with the flow type "vehicle control" indicated in FIG. 8.

In this example, it suffices that at least one of the number of frames or the frame size be added in at least one of step S1305, step S1307, step S1309, step S1311, or step S1313.

In this example, if the determination in at least one of step S1304 or step S1306 is Yes, flow tallier 215 may refrain from performing the processes at and after step S1308. Meanwhile, although it is preferable that, of the determination processes at steps S1304, S1306, S1308, S1310, and S1312, the determination processes as step S1304 and S1306 be performed before the determination processes at steps S1308, S1310, and S1312, the order of the determination processes is not limited to this example.

As described above, the amount of flow communication traffic may include the number of frames and the frame size each added in accordance with whether the vehicle state is any one selected from or a combination of two or more selected from in automatic driving, in automatic parking, in cruise control, in software update, in vehicle diagnosis, and in internet communication connection, in each of CAN network 20, FlexRay network 30, and Ethernet network 40.

Flowchart of Flow Transmitting Process

Figure 14:
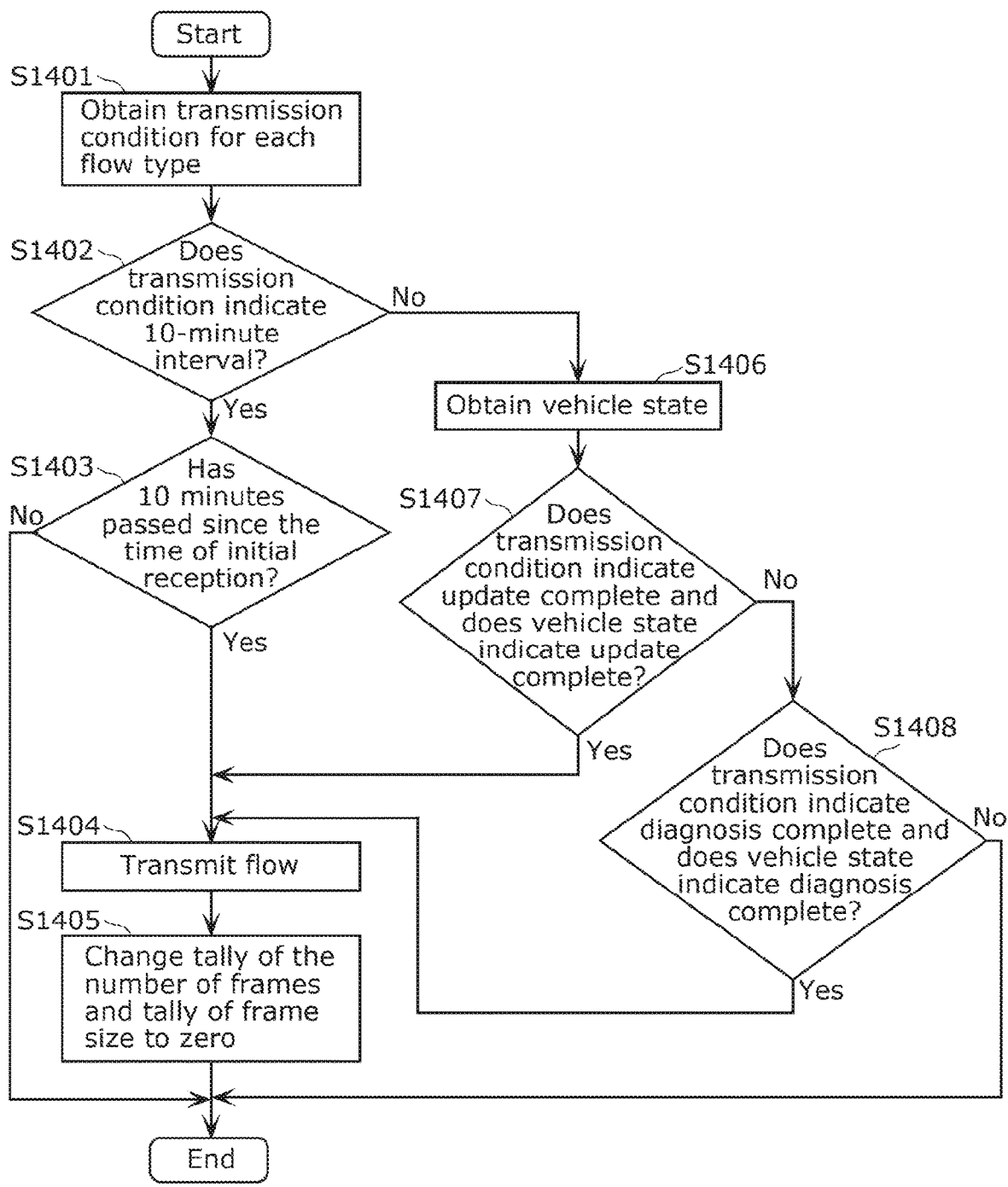
FIG. 14 illustrates a flowchart of a flow transmitting process according to one embodiment.

FIG. 14 illustrates a flowchart of a flow transmitting process according to the present embodiment. The flow transmitting process is executed by flow generating device 210.

(S1401) In response to the flow tally being updated, flow transmitter 217 of flow generating device 210 obtains the transmission condition for each flow type from flow storage 216 and performs step S1402.

(S1402) Next, if the transmission condition indicates a 10-minute interval (Yes at S1402), flow transmitter 217 performs step S1403. Meanwhile, if the transmission condition does not indicate a 10-minute interval (No at S1402), flow transmitter 217 performs step S1406.

(S1403) Next, flow transmitter 217 determines whether 10 minutes has passed since the time of initial reception. If 10 minutes has passed since the time of initial reception (Yes at S1403), flow transmitter 217 performs step S1404. Meanwhile, if 10 minutes has not passed since the time of initial reception (No at S1403), flow transmitter 217 terminates the flow transmitting process. In this example, if there is no time of initial reception, flow transmitter 217 stores the current system time as the time of initial reception.

(S1404) Next, flow transmitter 217 transmits a flow to anomaly detecting device 100 and performs step S1405.

(S1405) Next, flow transmitter 217 changes the tally of the number of frames and the tally of the frame size for the transmitted flow to zero and terminates the flow transmitting process. In other words, flow transmitter 217 resets the tally of the number of frames and the tally of the frame size.

(S1406) Next, flow transmitter 217 obtains (e.g., extracts) the vehicle state from vehicle state extractor 214 and performs step S1407.

(S1407) Next, flow transmitter 217 determines whether the transmission condition indicates the update complete and the vehicle state indicates the update complete. If the transmission condition indicates the update complete and the vehicle state indicates the update complete (Yes at S1407), flow transmitter 217 performs step S1404. Meanwhile, if the transmission condition and the vehicle state each indicate other than the update complete (No at S1407), flow transmitter 217 performs step S1408.

(S1408) Next, flow transmitter 217 determines whether the transmission condition indicates the diagnosis complete and the vehicle state indicates the diagnosis complete. If the transmission condition indicates the diagnosis complete and the vehicle state indicates the diagnosis complete (Yes at S1408), flow transmitter 217 performs step S1404. Meanwhile, if the transmission condition and the vehicle state each indicate other than the diagnosis complete (No at S1408), flow transmitter 217 terminates the flow transmitting process.

Flowchart of Anomaly Detecting Process

FIG. 15 illustrates a flowchart of an anomaly detecting process according to the present embodiment. The anomaly detecting process is executed by anomaly detecting device 100.

(S1501) Prior to this process, flow collector 110 of anomaly detecting device 100 receives a flow from each of flow generating device 210 and so on and stores the received flows into flow storage 120. Then, anomaly detector 140 obtains the flows of the respective protocols stored in flow storage 120 and calculates, for each flow type, the ratio of the tallies of the numbers of frames in the respective protocols (the proportions of the numbers of frames) and the ratio of the tallies of the data sizes in the respective protocols (the proportions of the data sizes). Then, anomaly detector 140 performs step S1502.

(S1502) Next, anomaly detector 140 determines whether there is a protocol of which at least one of the proportions of the numbers of frames or the proportions of the data sizes differs from the corresponding normal proportions of the numbers of frames or the corresponding normal proportions of the data sizes. Anomaly detector 140 may determine whether there is an anomaly based on whether the proportions of the numbers of frames and the proportions of the data sizes calculated at step S1501 differ from the normal ratio of the proportions of the numbers of frames and the normal ratio of the proportions of the data sizes at a predetermined rate or higher. For example, anomaly detector 140 performs a computation on the normal ratio of the tallies of the numbers of frames in the respective protocols indicated in the detection rule (the normal proportions of the numbers of frames) and the current ratio of the tallies of the numbers of frames in the respective protocols calculated at step S1501 and determines whether there is a protocol where its corresponding value in the resulting ratio differs from the remaining values at a predetermined rate or higher. Moreover, anomaly detector 140 compares the current ratio of the tallies of the data sizes in the respective protocols calculated at step S1501 against the normal ratio of the tallies of the data sizes in the respective protocols indicated in the detection rule and determines whether there is a protocol where its corresponding values in the ratios differ by a predetermined value or more. Then, if there is such a protocol (Yes at S1502), anomaly detector 140 performs step S1503. Meanwhile, if there is no such a protocol (No at S1502), anomaly detector 140 terminates the anomaly detecting process. For example, anomaly detector 140 terminates the anomaly detecting process if the proportions of the numbers of frames calculated at step S1501 and the proportions of the data sizes calculated at step S1501 are both normal.

The proportions of the number of frames and the proportions of the data sizes are each an example of the observed ratio. Meanwhile, the proportions of the number of frames are an example of the frame count ratio, and the proportions of the data sizes are an example of the data size ratio.

(S1503) Next, anomaly detector 140 determines, as an anomalous protocol, the protocol where the ratio calculated at step S1501 differs from the normal ratio by a predetermined value or more and terminates the anomaly detecting process.

As described above, the observed ratio includes at least one of the frame count ratio by protocol or the data size ratio by protocol, and the normal ratio includes at least one of the frame count ratio in a normal ratio or the data size ratio in a normal ratio. Then, anomaly detector 140 determines that there is an anomaly if at least one of the frame count ratio or the data size ratio included in the observed ratio differs from at least one of the frame count ratio or the data size ratio included in the normal ratio at a predetermined rate or higher.

In this example, it suffices that at least one of whether there is a protocol where the proportions of the numbers of frames differ from the normal proportions of the numbers of frames or whether there is a protocol where the proportions of the data sizes differ from the normal proportions of the data sizes be determined.

Other Embodiments

Thus far, some embodiments have been described to illustrate the techniques according to the present disclosure. However, the techniques according to the present disclosure are not limited to the above and can also be applied to other embodiments that include, for example but not limited to, modifications, substitutions, additions, or omissions, as appropriate. For example, the following variations are also encompassed by the embodiments of the present disclosure.

(1) According to the foregoing embodiment, security measures for a vehicle (e.g., an automobile) have been described, but the applicable range of the foregoing embodiment is not limited to the above example. The foregoing embodiment may be applied not only to automobiles but also to mobilities, such as construction machines, agricultural machines, ships, railroad vehicles, or aircrafts.

(2) According to the foregoing embodiment, flow storage 120 stores flows of the respective protocols. Alternatively, flow storage 120 may store flows of the respective networks. This configuration makes it possible to detect an anomaly by comparing the amounts of communication traffic over the networks where the same protocol is used.

(3) According to the foregoing embodiment, anomaly detector 140 calculates the rate of the corresponding values in the observed ratio and the normal ratio for each protocol and determines that there is an anomaly in a protocol where the calculated rate differs the most from the rest. However, there is no limitation on the calculation method as long as it involves a method of detecting an anomaly by comparing the observed ratio and the normal ratio. For example, anomaly detecting device 100 may determine the presence of an anomaly based on the difference between the observed ratio and the normal ratio.

(4) According to the foregoing embodiment, the vehicle state indicates that the vehicle is, for example, in automatic driving, in software update, or in vehicle diagnosis. Alternatively, the vehicle state may indicate that the vehicle is in internet connection. In this case, the car navigation ECU transmits a frame that includes the vehicle state indicating that the vehicle is in internet connection to the network, and vehicle state extractor 214 extracts the vehicle state from the frame.

(5) According to the foregoing embodiment, anomaly notifier 160 notifies a driver or an external server of an anomaly. Alternatively, the notification destination may be the police, the Department of Transportation, any approaching vehicle, a traffic system, or an organization that shares vulnerability information and the like.

(6) According to the foregoing embodiment, flow transmitter 217 is simply said to transmit a flow to anomaly detecting device 100, but flow transmitter 217 may transmit a flow in an IPFIX format. In this case, the Enterprise-specific field designated for the IPFIX format is used.

(7) A part or the whole of the constituent elements included in each device according to the foregoing embodiment may be implemented by a single system large scale integration (LSI). The system LSI is an ultra-multifunctional LSI manufactured by integrating a plurality of components on a single chip and is specifically a computer system that includes a microprocessor, a ROM, a RAM, and so on. The RAM has a computer program recorded therein. The microprocessor operates in accordance with the computer program, and thus the system LSI implements its functions. The constituent elements of each device described above may each be implemented by a single chip, or a part or the whole of such constituent elements may be implemented by a single chip. Although the term system LSI is used herein, depending on the difference in the degree of integration, the circuit may also be called an IC, an LSI, a super LSI, or an ultra LSI. The technique for circuit integration is not limited to the LSI, and an integrated circuit may be implemented by a dedicated circuit or a general purpose processor. A field programmable gate array (FPGA) that can be programmed after the LSI is manufactured or a reconfigurable processor in which the connection or the setting of the circuit cells within the LSI can be reconfigured may also be used. Furthermore, when a technique for circuit integration that replaces the LSI appears through the advancement in the semiconductor technology or through a derived different technique, the functional blocks may be integrated by use of such different techniques. An application of biotechnology, for example, is a possibility.

(8) A part or the whole of the constituent elements in each device described above may be implemented by an IC card or a stand-alone module that can be attached to or detached from each device. The IC card or the module is a computer system that includes a microprocessor, a ROM, a RAM, and so on. The IC card or the module may include the ultra-multifunctional LSI described above. The microprocessor operates in accordance with a computer program, and thus the IC card or the module implements its functions. The IC card or the module may be tamper resistant.

(9) One aspect of the present disclosure can be implemented in the form of a program (a computer program) that causes a computer to execute the method of detecting an anomaly as indicated in any one of FIG. 10 to FIG. 15 or in the form of digital signals composed of a computer program.

Moreover, one aspect of the present disclosure can be implemented in the form of a computer readable recording medium having the aforementioned computer program or the aforementioned digital signals recorded thereon, and examples of such a computer readable recording medium include a flexible disk, a hard disk, a CD-ROM, an MO, a DVD, a DVD-ROM, a DVD-RAM, a Blue-ray (BD) (registered trademark) disc, and a semiconductor memory. One aspect of the present disclosure may be the digital signals recorded on any of the aforementioned recording media. In one aspect of the present disclosure, the computer program or the digital signals may be transmitted via an electric communication circuit, a wireless or wired communication circuit, a network represented by the internet, data broadcast, or the like. One aspect of the present disclosure may provide a computer system that includes a microprocessor and a memory. The memory may have the computer program described above recorded thereon, and the microprocessor may operate in accordance with the computer program. Alternatively, the program or the digital signals may be recorded into a recording medium, which then may be transported, or the program or the digital signals may be transported via a network or the like. Thus, the program or the digital signals may be executed by a separate stand-alone computer system.

(10) The order in which the steps included in the flowcharts according to the foregoing embodiment are executed is merely an example that illustrates the present disclosure in concrete terms, and such order may differ from those described above. Some of the steps described above may be executed simultaneously (in parallel) with other steps, or some of the steps described above may not be executed.

How the functional blocks are divided in the block diagrams illustrated according to the foregoing embodiment is merely an example, and a plurality of functional blocks may be implemented as a single functional block, a single functional block may be divided into a plurality of functional blocks, or one or more functions may be moved to another functional block. The functions of a plurality of functional blocks having similar functions may be processed in parallel or through time division by a single piece of hardware or software.

(11) An embodiment obtained by combining the constituent elements and the functions illustrated in each of the foregoing embodiments and variations as desired is also encompassed by the scope of the present disclosure.

INDUSTRIAL APPLICABILITY

An anomaly detecting device according to one aspect of the present disclosure is effective in detecting an anomaly in an in-vehicle network that includes two or more networks provided in a vehicle or the like.

The invention claimed is:
1. An anomaly detecting device comprising:
a memory; and
a processor which, in cooperation with the memory, performs operations including:
collecting an amount of flow communication traffic in each of two or more networks in an in-vehicle network system that includes the two or more networks, the amount of flow communication traffic being information obtained by tallying an amount of communication traffic of one or more frames classified according to a predetermined rule that is based on header information of a network protocol; and calculating, based on the amount of flow communication traffic, an observed ratio indicating a ratio of respective amounts of communication traffic in the two or more networks and determining whether the two or more networks are anomalous based on the observed ratio calculated and a normal ratio indicating a ratio of respective amounts of communication traffic in the two or more networks in a normal state, wherein the predetermined rule is information used to append, to a frame, a classification label for classifying the frame, the amount of flow communication traffic is information that is based on the one or more frames classified according to the classification label, and the classification label includes software update and vehicle diagnosis.

2. The anomaly detecting device according to claim 1, wherein
the processor determines that the two or more networks are anomalous when the observed ratio and the normal ratio differ from each other at a predetermined rate or higher.

3. The anomaly detecting device according to claim 1, wherein
the processor determines that, of the two or more networks, a network in which the observed ratio and the normal ratio differ from each other at a highest rate is anomalous.

4. The anomaly detecting device according to claim 1, wherein
the two or more networks communicate by use of mutually different two or more network protocols,
the observed ratio is a ratio of respective amounts of communication traffic of the two or more protocols calculated based on the amount of flow communication traffic, and
the processor calculates, as the observed ratio, the ratio of the respective amounts of communication traffic of the two or more protocols based on the amount of flow communication traffic.

5. The anomaly detecting device according to claim 4, wherein
the processor determines that, of the two or more protocols, a protocol in which the observed ratio and the normal ratio differ from each other at a highest rate is anomalous.

6. The anomaly detecting device according to claim 1, wherein
the amount of flow communication traffic is information obtained by tallying the amount of communication traffic including at least either of a total number of frames or a data size of the one or more frames in each of the two or more networks, the one or more frames being classified according to a function based on an ID when the network protocol is CAN, CAN-FD, or J1939, classified according to the function based on a cycle and a slot when the network protocol is FlexRay, classified according to the function based on a MAC address, an IP address, or a port number when the network protocol is Ethernet, classified according to the function based on a message ID when the network protocol is SOME/IP, or classified according to the function based on a topic IP or a GUID when the network protocol is DDS.

7. The anomaly detecting device according to claim 1, wherein
the amount of flow communication traffic is information obtained by tallying the amount of communication traffic including at least either of a total number of frames or a data size of the one or more frames in each of the two or more networks, the one or more frames being classified according to a sender or a designated recipient based on an ID when the network protocol is CAN, CAN-FD, or J1939, classified according to the sender or the designated recipient based on a cycle and a slot when the network protocol is FlexRay, classified according to the sender or the designated recipient based on a MAC address, an IP address, or a port number when the network protocol is Ethernet, classified according to the sender or the designated recipient based on a message ID when the network protocol is SOME/IP, or classified according to the sender or the designated recipient based on a topic IP or a GUID when the network protocol is DDS.

8. The anomaly detecting device according to claim 1, wherein
the amount of flow communication traffic is information obtained by tallying the amount of communication traffic including at least either of a total number of frames or a data size of the one or more frames received within a period corresponding to a vehicle state in each of the two or more networks, the vehicle state including at least one of in automatic driving, in automatic parking, in cruise control, in software update, in vehicle diagnosis, and in internet communication connection.

9. The anomaly detecting device according to claim 1, wherein
when the processor determines that there is an anomaly, the processor notifies a vehicle's occupant or a server external to the vehicle of the anomaly.

10. The anomaly detecting device according to claim 1, wherein
the processor updates the normal ratio based on information obtained via an external network.

11. The anomaly detecting device according to claim 1, wherein
the predetermined rule provides, for each network protocol, an association between a field name included in the header information, the classification label, and an enabled or disabled state indicating whether appending of the classification label is enabled, and
the processor refrains from appending the classification label to a frame when the enabled or disabled state of the frame indicates that the appending is disabled.

12. The anomaly detecting device according to claim 1, wherein
the observed ratio includes at least one of a frame count ratio by the network protocol or a data size ratio by the network protocol,
the normal ratio includes the at least one of the frame count ratio in a normal state or the data size ratio in a normal state, and
the processor determines that there is an anomaly when the at least one of the frame count ratio or the data size ratio included in the observed ratio and the at least one of the frame count ratio or the data size ratio included in the normal ratio differ from each other at a predetermined rate or higher.

13. The anomaly detecting device according to claim 1, wherein
the classification label further includes all frames, automatic drive ECU, and vehicle control, and
the processor determines whether the two or more networks are anomalous based on observed ratios for each of classification labels, and the normal ratio indicating a ratio of respective amounts of communication traffic in each of the classification labels in the two or more networks in the normal state, the observed ratios each being the observed ratio, the classification labels each being the classification label.

14. The anomaly detecting device according to claim 1, wherein
the amount of flow communication traffic is information obtained by classifying frames according to the predetermined rule, the frames flowing over the network and not including the vehicle state.

15. The anomaly detecting device according to claim 1, wherein
the processor receives a frame to which the classification label is appended, and when a current vehicle state and the classification label correspond, updates the amount of flow communication traffic.

16. The anomaly detecting device according to claim 1, wherein
the observed ratio includes each of a frame count ratio by the network protocol or and data size ratio by the network protocol,
the normal ratio includes each of the frame count ratio in a normal state and the data size ratio in a normal state, and
the processor determines that there is an anomaly when each of the frame count ratio and the data size ratio included in the observed ratio and each of the frame count ratio and the data size ratio included in the normal ratio differ from each other at a predetermined rate or higher.

17. An anomaly detecting system in an in-vehicle network system that includes the two or more networks, the anomaly detecting system comprising:
the anomaly detecting device according to claim 1; and
a flow generating device that is connected to one or more networks of the two or more networks and tallies the amount of flow communication traffic, wherein
the flow generating device includes:
a memory; and
a processor which, in cooperation with the memory, performs operations including:
obtaining a frame in the one or more networks;
classifying the obtained frame according to the predetermined rule that is based on header information of a protocol used in the one or more networks;
tallying an amount of flow communication traffic that is information obtained by tallying an amount of communication traffic of one or more frames classified, the one or more frames each being the frame; and
transmitting the amount of flow communication traffic tallied to the anomaly detecting device.

18. The anomaly detecting system according to claim 17, wherein
the processor of the flow generating device classifies the frame according to a function based on an ID when the network protocol is CAN, CAN-FD, or J1939, classifies the frame according to the function based on a cycle and a slot when the network protocol is FlexRay, classifies the frame according to the function based on a MAC address, an IP address, or a port number when the network protocol is Ethernet, classifies the frame according to the function based on a message ID when the network protocol is SOME/IP, or classifies the frame according to the function based on a topic IP or a GUID when the network protocol is DDS, in each of the two or more networks.

19. The anomaly detecting system according to claim 17, wherein
the processor of the flow generating device classifies the frame according to a sender or a designated recipient based on an ID when the network protocol is CAN, CAN-FD, or J1939, classifies the frame according to the sender or the designated recipient based on a cycle and a slot when the network protocol is FlexRay, classifies the frame according to the sender or the designated recipient based on a MAC address, an IP address, or a port number when the network protocol is Ethernet, classifies the frame according to the sender or the designated recipient based on a message ID when the network protocol is SOME/IP, or classifies the frame according to the sender or the designated recipient based on a topic IP or a GUID when the network protocol is DDS, in each of the two or more networks.

20. The anomaly detecting system according to claim 17, wherein
the processor of the flow generating device classifies the frame based on a vehicle state in each of the two or more networks, the vehicle state including at least one of in automatic driving, in automatic parking, in cruise control, in software update, in vehicle diagnosis, or in internet communication connection.

21. The anomaly detecting system according to claim 17, wherein
the processor of the flow generating device further updates the predetermined rule.

22. An anomaly detecting method comprising:
collecting an amount of flow communication traffic in each of two or more networks in an in-vehicle network system that includes the two or more networks, the amount of flow communication traffic being information obtained by tallying an amount of communication traffic of one or more frames classified according to a predetermined rule that is based on header information of a network protocol; and
calculating, based on the amount of flow communication traffic, an observed ratio indicating a ratio of respective amounts of communication traffic in the two or more networks and determining whether the two or more networks are anomalous based on a normal ratio indicating a ratio of respective amounts of communication traffic in the two or more networks in a normal state and the observed ratio, wherein
the predetermined rule is information used to append, to a frame, a classification label for classifying the frame,
the amount of flow communication traffic is information that is based on the one or more frames classified according to the classification label, and
the classification label includes software update and vehicle diagnosis.

* * * * *